(12) United States Patent
DiFrancesco

(10) Patent No.: US 7,787,010 B2
(45) Date of Patent: Aug. 31, 2010

(54) VIDEO TO FILM FLAT PANEL DIGITAL RECORDER AND METHOD

(75) Inventor: David DiFrancesco, San Francisco, CA (US)

(73) Assignee: Pixar, Emeryville, CA (US)

( * ) Notice: Subject to any disclaimer, the term of this patent is extended or adjusted under 35 U.S.C. 154(b) by 1950 days.

(21) Appl. No.: 10/700,299

(22) Filed: Oct. 31, 2003

(65) Prior Publication Data

US 2004/0184763 A1    Sep. 23, 2004

Related U.S. Application Data

(63) Continuation-in-part of application No. 10/392,399, filed on Mar. 20, 2003, now abandoned, and a continuation-in-part of application No. 10/637,744, filed on Aug. 8, 2003, now Pat. No. 7,463,821, and a continuation-in-part of application No. 10/638,135, filed on Aug. 8, 2003, now Pat. No. 7,576,830.

(60) Provisional application No. 60/493,539, filed on Aug. 8, 2003.

(51) Int. Cl.
*H04N 5/253*    (2006.01)

(52) U.S. Cl. .......................................... 348/96; 348/97

(58) Field of Classification Search ............ 348/96–109
See application file for complete search history.

(56) References Cited

U.S. PATENT DOCUMENTS

| | | | |
|---|---|---|---|
| 3,220,792 A | 11/1965 | Vendig | |
| 3,824,336 A | 7/1974 | Gould et al. | |
| 3,867,022 A | 2/1975 | Whatley et al. | |
| 4,096,530 A | 6/1978 | Plugge et al. | |
| 4,305,089 A | 12/1981 | Hosoya | |
| 4,473,849 A | 9/1984 | Cool | |
| 4,688,104 A | 8/1987 | Wolcott | |
| 4,715,683 A | 12/1987 | Gregory et al. | |
| 4,752,823 A | 6/1988 | Takashi et al. | |
| 4,754,334 A * | 6/1988 | Kriz et al. | 386/130 |
| 4,757,374 A * | 7/1988 | Ramsay et al. | 355/40 |
| 4,827,434 A | 5/1989 | Hanau et al. | |

(Continued)

FOREIGN PATENT DOCUMENTS

DE    4211128    10/1993

(Continued)

OTHER PUBLICATIONS

European Search Report EP 03 74 7282.

(Continued)

*Primary Examiner*—David Czekaj
(74) *Attorney, Agent, or Firm*—Townsend and Townsend and Crew LLP

(57) ABSTRACT

A method for recording video images onto film media includes orienting a flat panel display relative to a film recording device, receiving a first frame of video data and a second frame of video data, displaying a first display image on the flat panel data, wherein the first display image is determined in response to the first frame of video data, and while displaying the fist display image on the flat panel display, exposing a portion of the film media with the film recording device.

13 Claims, 17 Drawing Sheets

U.S. PATENT DOCUMENTS

| | | | |
|---|---|---|---|
| 4,975,779 | A | 12/1990 | Boudry |
| 4,985,762 | A | 1/1991 | Smith |
| 5,049,927 | A | 9/1991 | Tsushima et al. |
| 5,249,056 | A | 9/1993 | Gunday et al. |
| 5,294,993 | A | 3/1994 | Sable |
| 5,653,522 | A | 8/1997 | Loucks |
| 5,754,184 | A | 5/1998 | Ring et al. |
| 5,771,109 | A | 6/1998 | DiFrancesco |
| 5,841,418 | A | 11/1998 | Bril et al. |
| 5,975,705 | A | 11/1999 | Lee |
| 6,226,033 | B1 * | 5/2001 | Glasgow ................ 348/97 |
| 6,248,448 | B1 | 6/2001 | Lippey et al. |
| 6,262,790 | B1 | 7/2001 | Kinjo |
| 6,283,599 | B1 | 9/2001 | Lin |
| 6,359,676 | B1 | 3/2002 | Treiber et al. |
| 6,535,190 | B2 | 3/2003 | Evanicky |
| 6,842,194 | B1 * | 1/2005 | Sugihara ................ 348/441 |
| 7,053,927 | B2 * | 5/2006 | Jones et al. ............. 348/97 |
| 7,369,179 | B1 * | 5/2008 | Lippman ................ 348/558 |
| 2001/0020933 | A1 * | 9/2001 | Maggioni ............... 345/156 |
| 2002/0063963 | A1 | 5/2002 | Whitehead et al. |
| 2002/0163657 | A1 * | 11/2002 | Bogdanowicz et al. ..... 358/1.9 |
| 2002/0163676 | A1 | 11/2002 | Jones et al. |
| 2002/0167701 | A1 | 11/2002 | Hirata |
| 2002/0171618 | A1 | 11/2002 | Lowles et al. |
| 2003/0086065 | A1 | 5/2003 | Morton et al. |

FOREIGN PATENT DOCUMENTS

| | | |
|---|---|---|
| EP | 0980021 | 2/2000 |
| JP | 60103791 | 10/1985 |
| WO | WO 97/21144 | 6/1997 |

OTHER PUBLICATIONS

Inoshiro, Kuro5hin, Kuro5hin.org Mission Statement, updated Sep. 10, 2000, http://www.kuro5hin.org/special/mission, printed Jul. 23, 2003, p. 1 of 2.

MetaFilmCorp.com, Digital Intermediate, The totally digital post production process, http://www.metafilmcorp.com/ei_overview.htm, printed Jun. 23, 2003, p. 1 of 2.

MetaFilmCorp.com, LCD technology, http://www.metafilmcorp.com/metaflash_technology.htm, printed Jun. 23, 2003, p. 1 of 2.

MetaFilmCorp.com, About Us, http://www.metafilmcorp.com/about.htm, printed Jun. 23, 2003, p. 1 of 1.

http://www.metalfilmcorp.com/pictures/april103/metalfsh.jpg, printed Jun. 23, 2003, p. 1 of 1.

SIGGRAPH 2003, High-Dynamic-Range Display System, http://www.siggraph.org/s2003/conference/etech/hdr.html, printed Aug. 19, 2003, p. 1 of 2.

Sony, Sony Global, Press Releases, Sony develops SXRD, a display device capable of generating high resolution, high contrast images of film quality smoothness, http://www.sony.net/SonyInfo/News/Press/200302/03-008E/printed Jun. 27, 2003, p. 1 of 3.

Sunnybrook Technologies, HDR: Displaying the Real World, British Columbia, Canada.

Yourganov et al., Acquiring High Dynamic Range Video at Video Rates, Technical Report, Dept. of Computer Science, York University, May 2001.

* cited by examiner

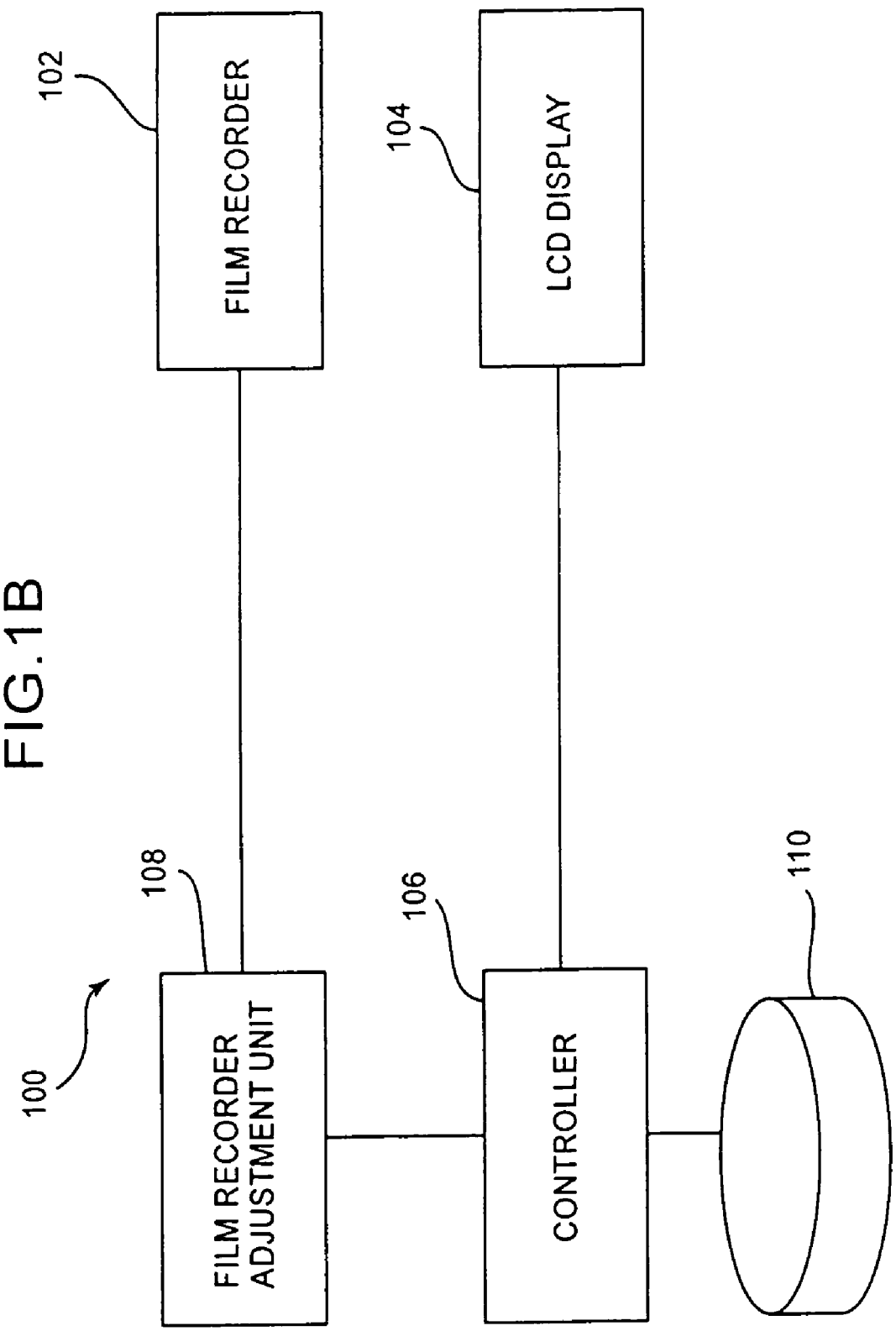

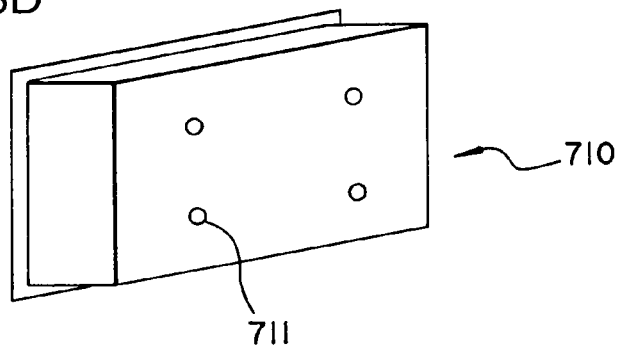
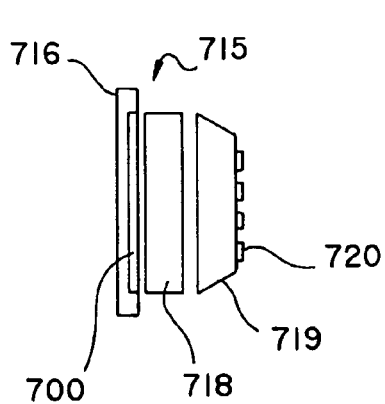
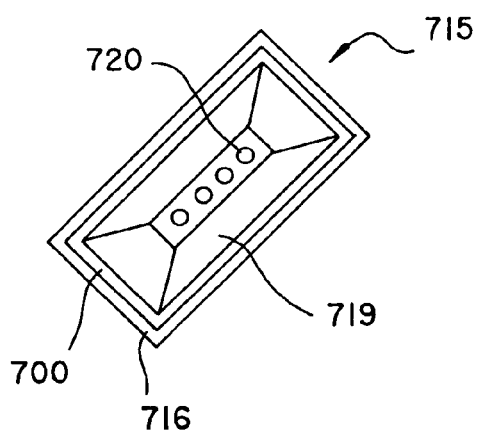
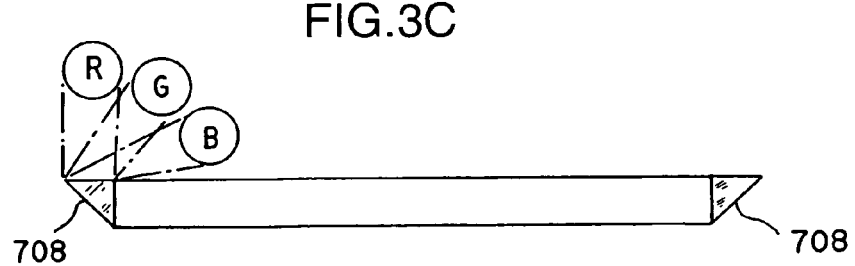

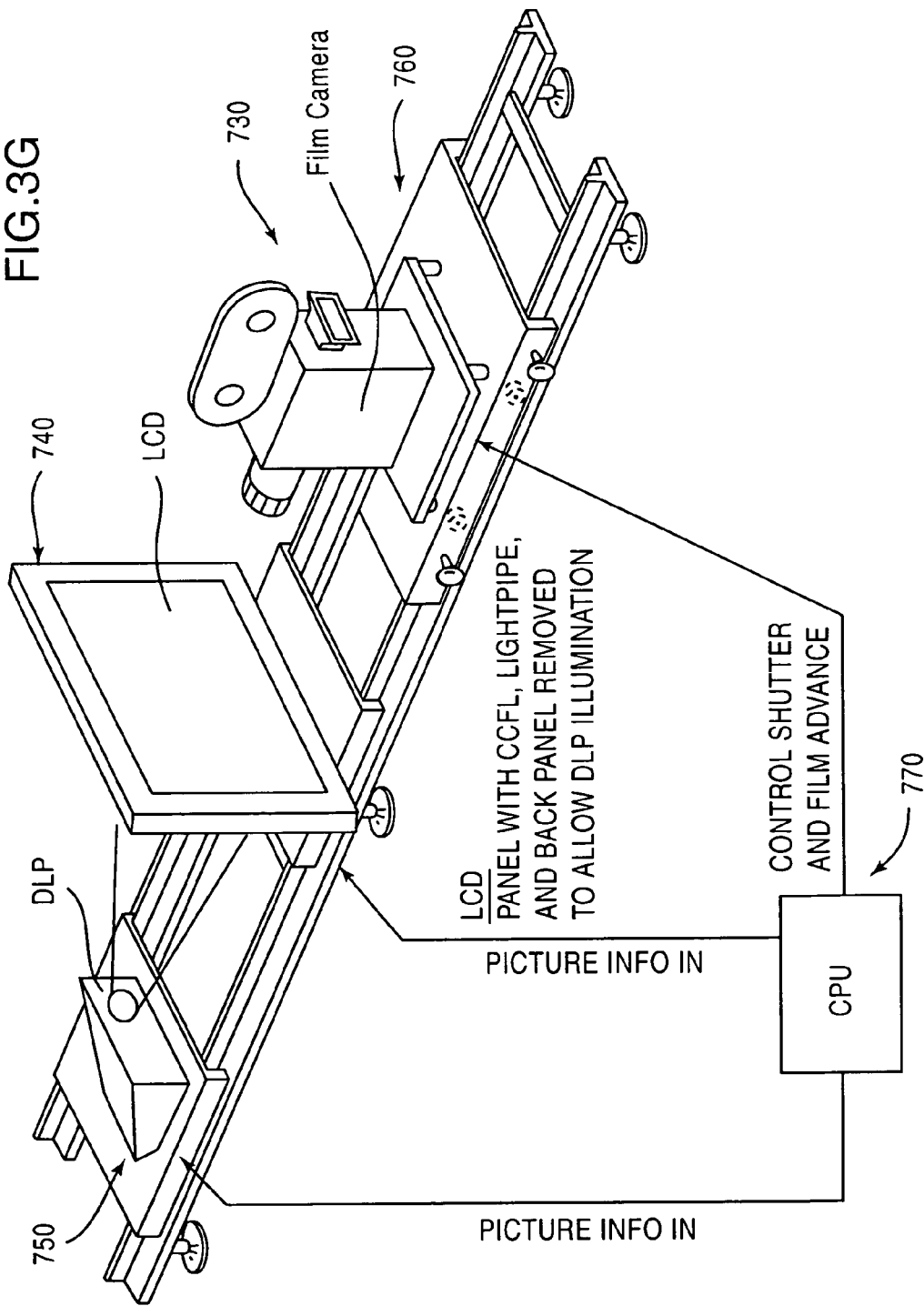

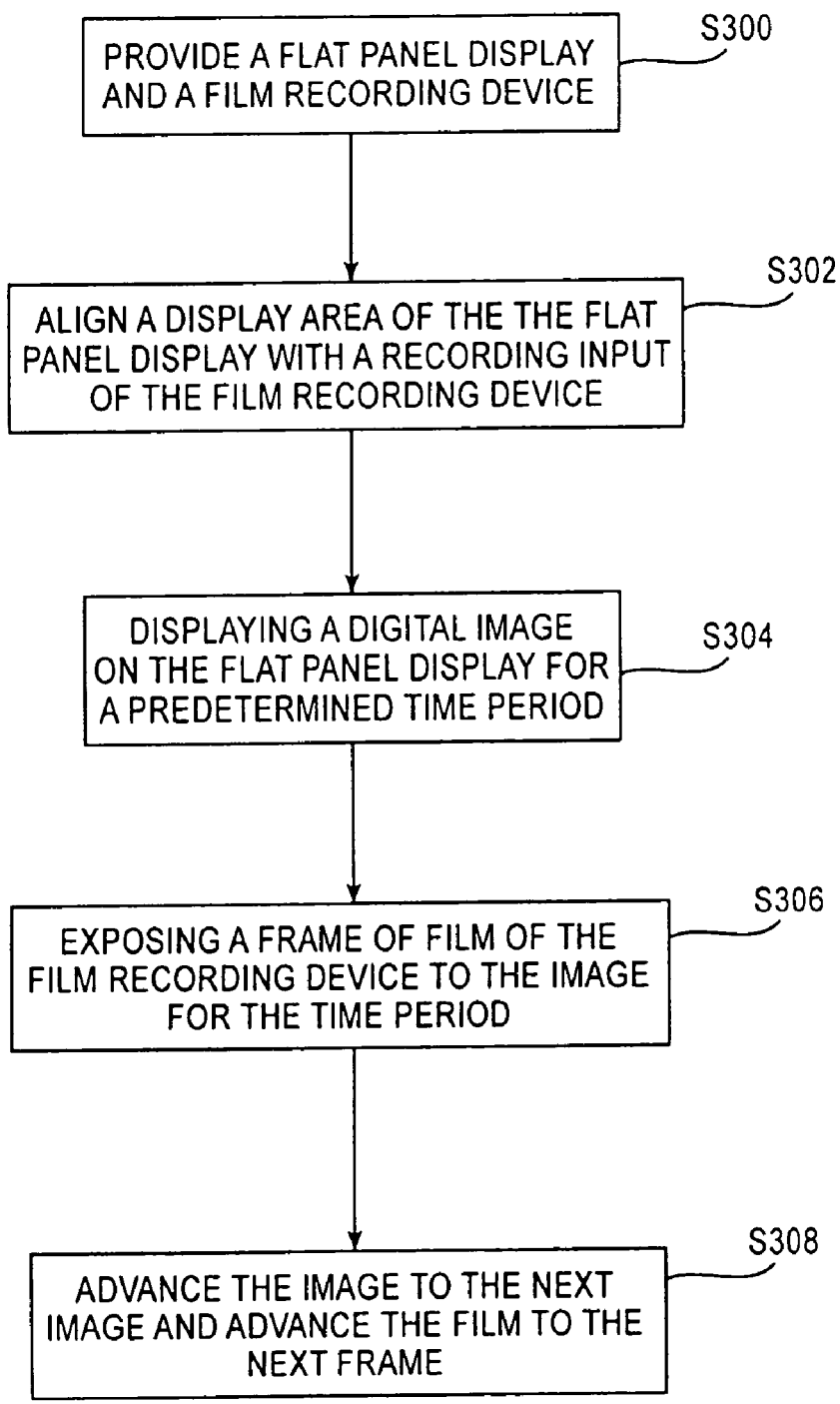

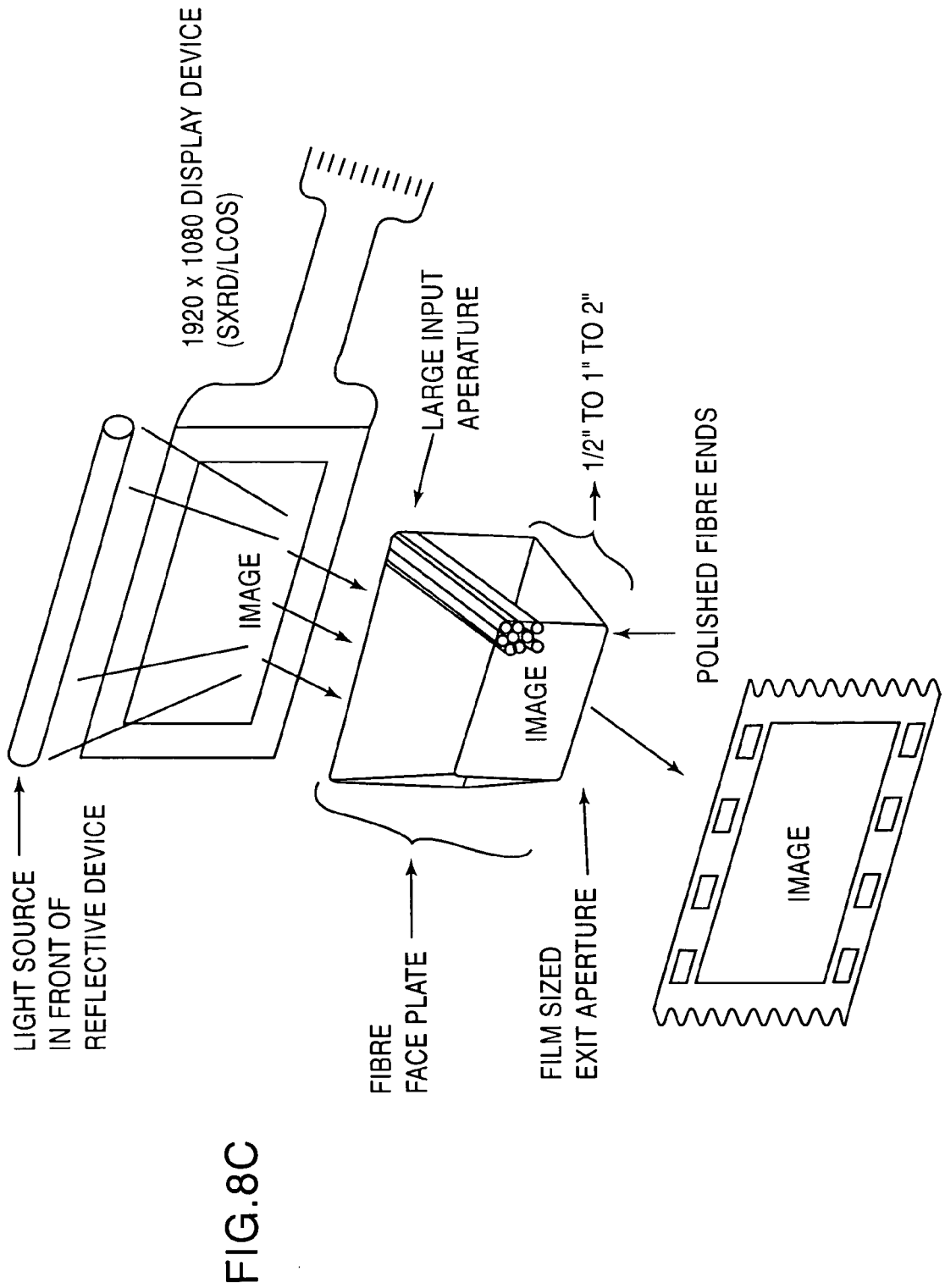

VIDEO TO FILM FLAT PANEL DIGITAL RECORDER AND METHOD

CROSS-REFERENCES TO RELATED APPLICATIONS

The present invention claims priority and incorporates by reference for all purposes Flat Panel LCD, application Ser. No. 10/392,399 filed Mar. 20, 2003; Flat Panel Digital Film Recorder, PCT application No. PCT/US03/11492 filed Apr. 25, 2003; Flat Panel Image to Film Transfer Method and Apparatus, application Ser. No. 10/637,744, filed Aug. 8, 2003, now U.S. Pat. No. 7,463,821, issued Dec. 9, 2008; Configurable Flat Panel Image to Film Transfer Method and Apparatus, application Ser. No. 10/638,135, filed Aug. 8, 2003; Flat Panel Digital Film Recorder and Method, Provisional Application 60/493,539 filed Aug. 8, 2003; and Flat Panel Digital Recorder and Method, application Ser. No. 10/698,954, filed Oct. 31, 2003;

BACKGROUND OF THE INVENTION

The present invention relates to image to film transfer. More particularly, the present invention relates to techniques and apparatus for efficient recording of images to film media.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarves" and "Fantasia" (1940). This animation technique typically required artists to hand-draw (or paint) animated images onto a transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arraigned, one or more frames of film would be taken of that specific arrangement. Stop motion animation techniques were developed by movie makers such as Willis O'Brien for movies such as "King Kong" (1932). Subsequently, these techniques were refined by animators such as Ray Harryhausen for movies including "The Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer aided animation (CAA) industry was Pixar Incorporated. Pixar developed both computing platforms specially designed for CAA, and animation software now known as RenderMan®. By moving to CAA, Pixar was faced with additional challenges. One such challenge was how to accurately and effectively transfer CAA images onto film. In response to this problem, Pixar invented a proprietary laser film recording system named Pixarvision™.

Despite these advances, the inventors of the present invention believed that further advances could be achieved in image to film transfer. One such advance was to reduce the amount of time needed to record an image onto frame. Previously, laser film recording could take up to 50 seconds per frame, however with advances in technology, such as Pixarvision™, this time was reduced to about 5 seconds per frame. Because a typical feature-length movie may have approximately 160,000 frames, even at 5 seconds per frame, it would take over nine days straight to transfer the movie to film.

Another such advance was to increase the quality of release prints. As is known in the industry, an original camera negative is typically printed to form one or more prints termed "interpositives" from which one or more copies are made termed "internegatives" from which release prints are made. In the present case, the inventors recognized that if they could reduce the cost of creating an original camera negative sufficiently, one or more generation of intermediate could be eliminated. In such a case, the release print would be closer to the original camera negative in quality. Currently, as merely an example, a typical film transfer service bureau may charge from $2 to $3 per frame, thus a feature-length movie may cost up to $500,000 per master negative. Further, typical films require a minimum of three master negatives. Because of this high cost, typically three or fewer master negatives are printed.

In light of the above, the inventors of the present invention have realized that it is desirable to make further enhancements in the area of image to film transfer.

BRIEF SUMMARY OF THE INVENTION

The present invention relates to image to film transfer. More particularly, the present method relates to new apparatus and techniques for increasing film transfer speed and film transfer quality.

According to one aspect of the invention, a method for recording video images onto film media is described. One technique includes orienting a flat panel display relative to a film recording device, and receiving a first frame of video data and a second frame of video data. The process may also include displaying a first display image on the flat panel data, wherein the first display image is determined in response to the first frame of video data, and while displaying the fist display image on the flat panel display, exposing a portion of the film media with the film recording device.

According to another aspect of the invention, a recording system is disclosed. One system includes a flat panel display configured to display a first video frame and a second video frame, and a control unit coupled to the flat panel display, configured to receive video data including data associated with the first video frame and data associated with the second video frame, wherein the control unit is also configured to determine the first video frame in response to the data associated with the first video frame and configured to determine the second video frame in response to the data associated with the second video frame, and wherein the control unit is also configured to drive the flat panel display with the first video frame and the second video frame. The apparatus may also include a film recorder configured to record images displayed on the flat panel display, and an adjustment mechanism coupled to the flat panel display and to the film recorder, the adjustment mechanism configured to adjust the orientation of the flat panel display relative to the film recorder.

According to yet another aspect of the invention a method for transferring video data to film is detailed. One process includes positioning a film camera and a flat panel display relative to each other such that an optical-axis of the film camera is substantially parallel to an optical-axis of the flat panel display, receiving at least a portion of a stream of video data, and determining first data for a first image from the portion stream of video data. Various methods include driving the flat panel display with the first data, displaying the first image on the flat panel display in response to the first data, and recording the first image onto a first frame of film media with the film camera. One technique includes advancing the film media, determining second data for a second image from the portion of the stream of video data, and driving the flat panel display with the second data. The process may include displaying the second image on the flat panel display in response to the second data, and recording the second image onto a second frame of film media with the film camera.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIGS. 1A-C illustrate embodiments of the present invention;

FIGS. 3A-C illustrate additional embodiments of a display device according to the present invention;

FIGS. 3D-F illustrate additional embodiments of the present invention;

FIGS. 3G-J illustrate additional embodiments of the present invention;

FIG. 6 illustrates a diagram of a flow chart according to an embodiment of the present invention;

FIGS. 8A-C illustrate additional embodiments of the present invention.

DETAILED DESCRIPTION OF THE INVENTION

Figure 1A:
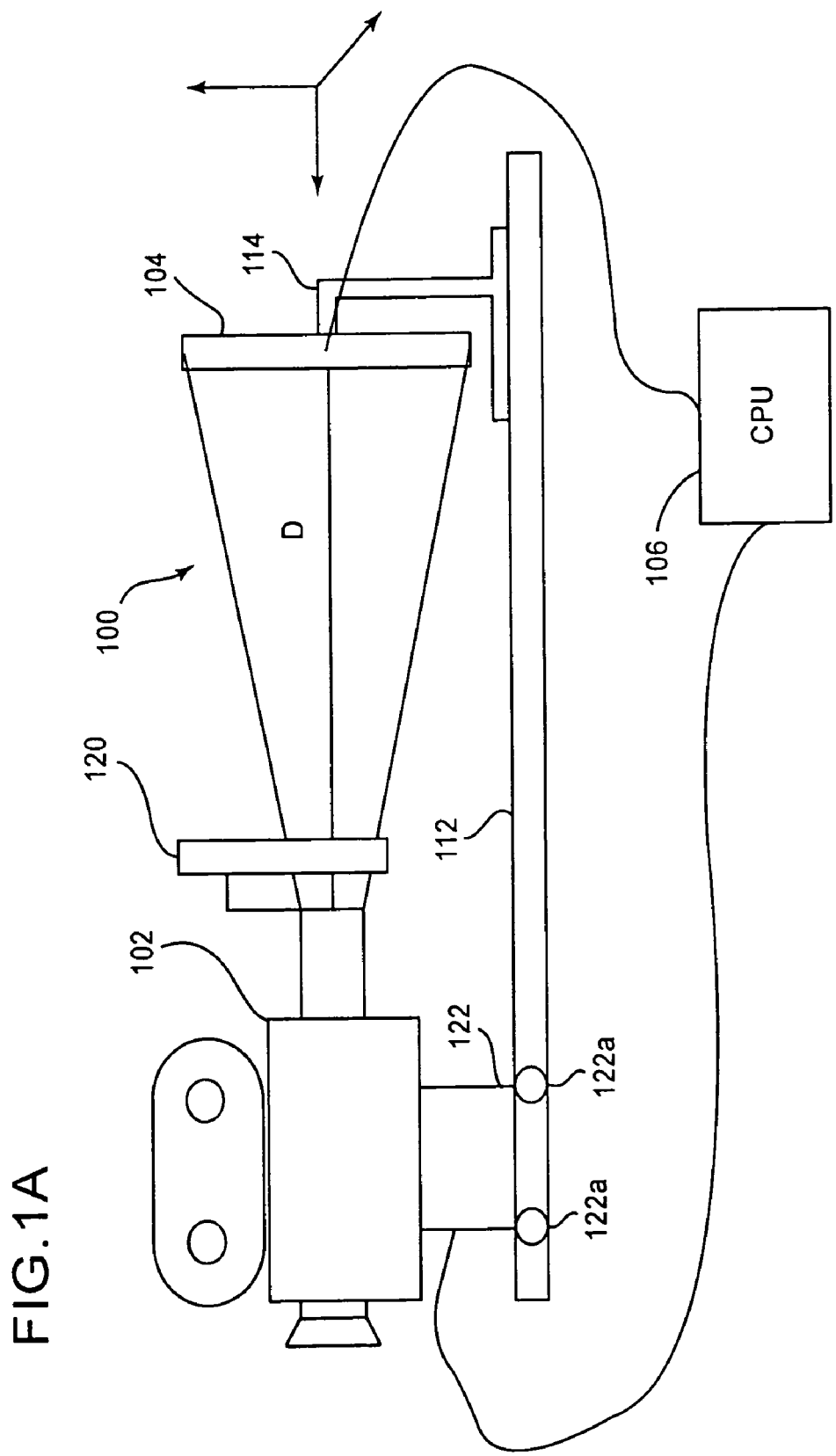
Figure 1C:
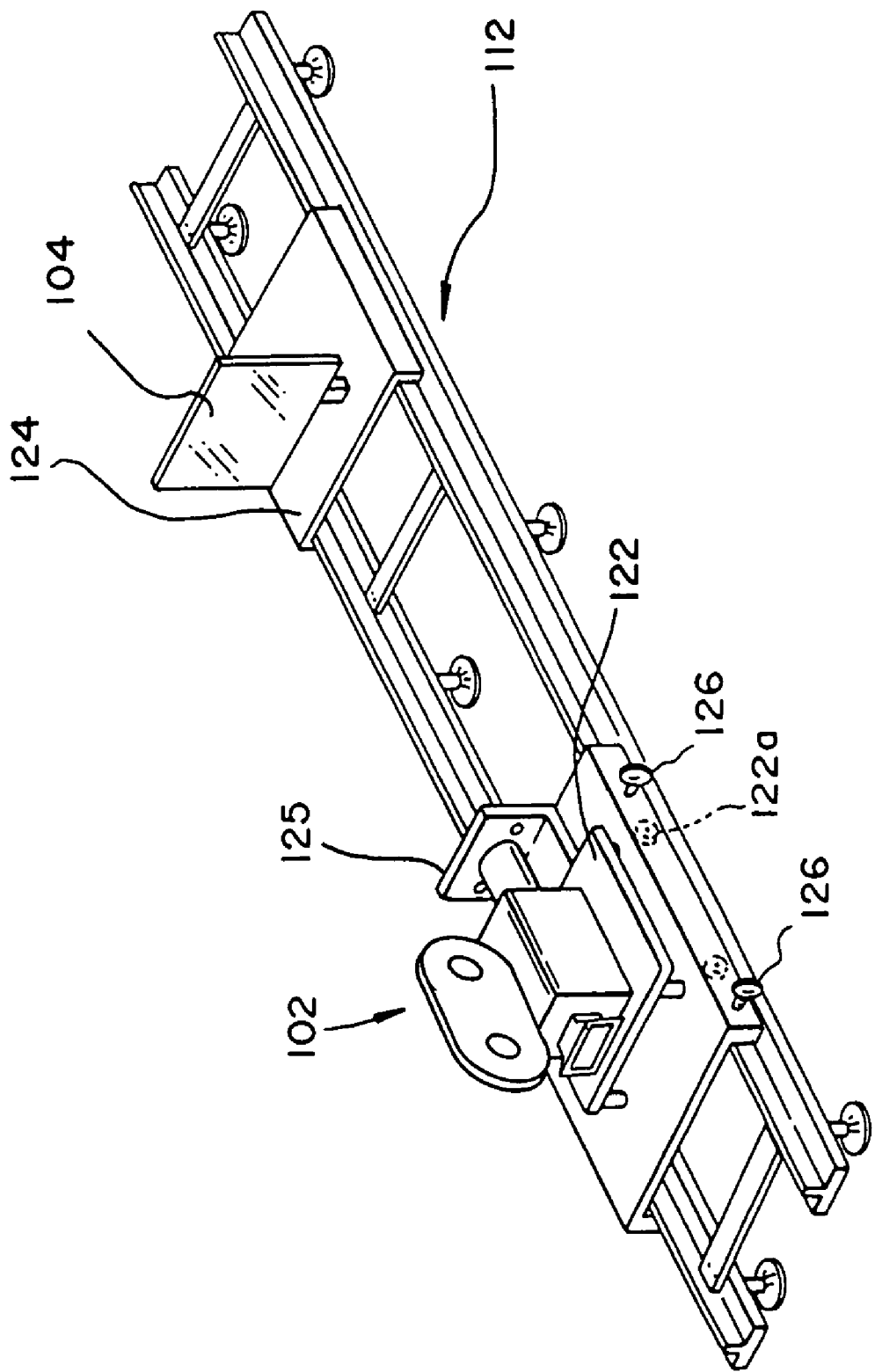

FIGS. 1A-C illustrate embodiments of the present invention. More particularly, FIGS. 1A-C illustrate a digital film recorder system. In FIG. 1A, a system 100 includes an optical recording device 102 (e.g. a movie film recorder, a still film camera), a display device 104 (e.g. a flat-panel display), a track 112, and a central processing unit (CPU) 106. The track 112 may run in a Z-direction and may include support members such as rails, rods, or the like for attaching film recording device 102 and display device 104 thereto. Devices 102 and 104 may be attached to the track and be moved towards and away from each other with the use of movable platforms, for example. In one embodiment, devices 102 and 104 may be semi-permanently secured to the track by any known device or method. In one embodiment, the positions of devices 102 and 104 are adjustable.

In the present embodiment, film recording device 102 may be any conventional optical recording device, such as a 16-millimeter, 35-millimeter, or 70-millimeter film movie cameras. Further, the optical recording media may be any conventional media, such as film media, or the like.

In the present embodiment, film recording device 102 is mounted upon a movable platform 122 that is mounted to track 112, with wheels 122a. The movable platform may be motorized and controlled by a control unit or other device, such as CPU 106. Accordingly, the distance "D," a distance between the front of display device 104 and a lens of the film recording device 102 may be adjusted by sliding the movable platform 122 along the track in either direction.

In the present embodiment, cameras used as the film recording device 102 may be auto focus or manual focus cameras. Additionally, such cameras may include an adjustment unit (not individually shown) for adjusting the focal length and aperture size of a lens, media (e.g. film) exposure time, media advancement, and any other conventional adjustable parameters of film cameras. The adjustment unit of the film recording device 102 may also be coupled to CPU 106. Accordingly, CPU 106 may adjust any of the characteristics of the camera remotely, may control the camera motor to advance film, may control the camera shutter, and the like.

Display device 104 may be a thin-film technology flat panel liquid crystal display (LCD) and may be coupled with CPU 106. In one embodiment, CPU 106 is also configure to drive (provide) display device 104 with images. In another embodiment, a separate CPU may be used to drive display device 104. These images are typically provided in digital format, however, the images may also be provided in analog format in other embodiments. In other embodiments, displays built on other display technologies are also contemplated, such as OLED, plasma, and the like.

In one embodiment, display device 104 is based upon a 23-inch thin-film transistor (TFT) active matrix liquid crystal panel, having approximately 4000 (3840) by 2500 (2400) pixel resolution, 16×9 aspect ratio. In one non-limiting example, such a panel is manufactured by International Display Technology Co., Ltd., Japan, and available through IBM. In another embodiment, display device 104 is based upon a 23" 1920×1200 pixel resolution LCD. In one non-limiting example, such a panel is manufactured by LG Philips, and available through Apple computer. In various embodiments, displays 104 are configured to be driven with 24-bit data (16.7 million colors), although in other embodiments, a greater bit-depth may become available. One of ordinary skill in the art will recognize that embodiments of the present invention may use high-resolution displays that currently exist or may use displays and display technologies that will be developed in the future. In contemplated embodiments, display device 104 may be based upon active-matrix (or passive) organic light emitting diode (OLED) technology, DLP digital light technology, LCOS technology, plasma technology, EL technology, or the like. Additional embodiments may include other novel features described in the above-referenced applications such as a display with additional stroboscopic illumination, a display with additional LED illumination, an LCD display pumped with DLP illumination, or the like.

It will be understood by one skilled in the art that many desired effects may be achieved by varying the size of the display, the resolution of the display, the brightness of the display, the distance between the display area of the display and the lens of the recording device, and the like. The camera characteristics of the recording device may be varied to achieve any effect desired. Further, many techniques may also be used to enhance the image displayed on display device 104.

In one example, spatial dithering techniques can be used to effectively increase the number of apparent colors of display device 104. As is known, display devices typically have a limited number of colors that may be reproduced, for example, a display device may support output 256 colors (8-bits) for each primary color component. In one example, spatial dithering techniques may be used to drive two adjacent pixels with a first and second color to give an effective appearance of a third color on the display. In one example, it has been determined that using spatial dithering techniques, the display device can appear to have an effective output of up to 1024 colors (10-bits) for each primary color component.

In operation, if an un-reproducible color for a pixel is desired that lies between two reproducible colors on the display device, pixels of the display device may are assigned the two reproducible colors. In one embodiment, determining which pixel is assigned which one of the two (or more) colors may be random and weighted with the color that is closest to the desired one. When exposed to these display pixels, the film media integrates the colors to form the desired color.

In one example, using a 3480×2400 pixel display and having every four pixels in a square represent a dithered color, the effective optical resolution of the display decreases by approximately half to 1740×1200. The effective resolution is smaller than typically desired for film transfer, accordingly other dithering methods to increase the number of colors recorded by the film may be used in addition to, or instead of spatial dithering.

In another example, temporal techniques can be used to effectively enhance the number of apparent colors of display device 104. In this embodiment, a frame of film media is exposed to a series of images on display device 104. For a particular pixel on display device 104, in the series of images, that value may vary. The values for that pixel may both be greater or lesser in value than the target color. Since the film media integrates the colors, the color recorded at that pixel location may be one display device 104 is not normally able to produce. Accordingly, the apparent bit-depth for each primary color component is effectively increased.

In still other embodiments, combinations of spatial and temporal dithering techniques may be used to increase the number of colors that are recorded onto a film media. Dithering techniques thus effectively increase the number of effective bits per color recorded onto film media. In one embodiment, the increase is estimated to increase the effective bit-depth from 8 bits per color to 10 bits per color, or greater.

In the present embodiment, because even the highest quality display devices 104 are not completely perpendicular to surface 112, a precision adjustment device 114 may be attached to the rear of display device 104 to adjust the orientation of the display. Adjustment device 114 may also be used as a movable mount for display device 104 to track 112 to allow display device 104 to be moved towards or away from recording device 102. In one embodiment of the present invention, adjustment device 114 may be an XYZ gimbal attached to the rear of display device 104. In this embodiment, the XYZ gimbal includes extremely fine adjustment capabilities should be used to more precisely orient the active display area of display device 104 with the lens of the recording device 102. For example, the gimbal may allow display device 104 to be positioned relative to recording device 102, facing to the right or left (pan), tilting up or down (tilt), rotated clockwise or counterclockwise (roll), and even moving up or down. One having ordinary skill in the art will readily understand that many instruments may be used to help ensure that display device 104 is "flat" relative to recording device 102. In other words, the optical axis of display device 104 will be substantially parallel to the optical axis of recording device 102. In some cases, the optical axis of display device 104 and recording device will not only be parallel, but be along the same line, i.e. co-linear. Additionally, dithering may be used to achieve relatively flawless effects on large display panels.

In the present embodiment, recording device 102 is focused upon the display portion of display device 104. More specifically, one or more lenses of recording device 102 are adjusted until an image of display device 104 is focused upon the image plane where the film media, or the like, is located. In one embodiment, this may be facilitated by projecting one or more test patterns on the display portion of display device 104. The size and resolution of the image may be adjusted by moving the display device 104 closer or farther away from the film recording device 102 along the track 112. The size of the display device 104 may be adjusted as well. The display portion of display device 104 is located at the focal plane of recording device 102.

In the present embodiment, an integrated controller (e.g., CPU 106) may be used to monitor and/or drive the images being displayed on display device 104. CPU 106 may also be used as well as used to physically adjust recording device 102 and display device 104, as described above. For example, resolution of an image may be changed by changing the distance D between recording device 102 and display device 104, and/or by changing the display area size (image resolution) of the image being displayed on display device 104. In the present embodiment, the appropriate software may be executed on CPU 106 in order to accomplish the described features. In other embodiments, display device 104 may be driven separately from recording device 102. However, in such embodiments, it is still desirable to coordinate the operation of these devices in some way.

FIG. 1B is a block diagram of system 100 according to an embodiment of the present invention. System 100 may include a film recording device 102, a display device 104, a controller 106, a film recorder device adjustment unit 108, and a storage device 110 (e.g., data warehouse, disk farm, etc.). These devices may be configured as already described above with reference to FIG. 1A.

In this embodiment, the display device 104 is coupled with the controller 106. Controller 106 is coupled with the storage device 110 and film recorder adjustment unit 108. The film recorder adjustment unit 108 is also coupled with the film recorder device 102 and is configured to adjust the distance D between the film recording device 102 and the display device 104 and to adjust the camera characteristics of the film recording device 102, such as focal length, focus, etc.

In this embodiment, the controller 106 may include a CPU and is typically configured to control the display of images stored on storage device 110 onto display 104 as well as configured to coordinate and control the film recording device 102 via the film recorder adjustment unit 108. Further, the film recorder adjustment unit 108 may include actuators and motors which may or may not be part of the film recording device 102. Additionally, film recorder adjustment unit controls the advancement of the film, opening and closing of the shutter, etc.

FIG. 1C illustrates an embodiment of the present invention, More specifically, FIG. 1C illustrates a three-dimensional view of one embodiment. Illustrated in FIG. 1C are a track 112, movable platform 122, a recording device 102 mounted thereon, and another movable platform 124 for mounting one or more display devices 104. As shown, a shroud or a shutter mount 125 is provided which may be used in conjunction with the recording device 102 in order to better control exposure.

In the present embodiment, track 112 can include one or more cross member supports and feet. In one embodiment, platform 122 (and/or platform 124) includes one or more tie down hand bolts 126 for securing platform 122 relative to the track 112. Further, one or more wheels 122a may be provided to facilitate movement of platform 122 on track 112. In other embodiments platform 122 may also be laterally adjustable with respect to platform 124.

To reduce the amount of time required to record an image onto optical media, it is desired to increase the brightness of light from display device 104. To achieve the desired brightness and color gamut output, system 100 may be configured to record images to film using several different techniques. In a first embodiment, full color images are displayed at one time on display device 104 and these images are recorded onto conventional color film. Additional illumination sources may be provided by adding white or colored backlighting, such as LED backlighting, stroboscopic flash, externally filtered backlighting, or the like.

In a second embodiment, controller 106 may also be programmed to display separate color component images on display device 104, one at a time. Examples of separate color components include RGB (red-green-blue), CMY (cyan-magenta-yellow), or the like. In such an embodiment, controller 106 is be configured to project a series of images on display device 104, each image in separate specific color component or wavelengths. For example, display device 104 will project a red image, then a green image, and then a blue image. As described below, the amount of time the film media is exposed to the images may depend upon the component color.

In a third embodiment, a plurality of component color separation filters may be provided to display device 104. In conjunction, display device 104 may be configured to output images that are monochromatic (grayscale, black and white) (Please note that from here forward in the document, when referring to configurations that include color separation filters, it is envisioned that a monochromatic (grayscale) output display device 104 may also be used.)

In one embodiment, a filter wheel 601 may be incorporated or positioned between display device 104 and the lens of recording device 102 in a variety of places, for example, between the lens and the film gate (see FIGS. 5A-B), between an illumination source (backlight) and display device 104 (e.g., at the light guide), or the like. Filter wheel 601 may be controlled to adjust to the color of the image exposed to the film media.

In one embodiment, the amount of time (exposure) each component color image is projected onto film media may be different. For example red requires 10 timed units, green requires 12 timed units, and blue requires 11 timed units. Accordingly, in such cases, controller 106 is configured to display the image in each color component for the desired amount of time to record the image before advancing the film. Alternatively, controller 106 controls the opening and closing of a shutter of recording device 102 so that the film media is exposed to each color component for the desired amount of time.

In the present embodiment, display devices 104 that are monochromatic often have larger contrast ratios. Accordingly, images recorded onto the film media will also have larger contrast ratios and color gamuts. The ON-OFF state of the LCD display 104 can be configured to calculate exposures sequentially frame by frame. By filling each cell independently and using RGB or CMY separation filters, an exposure can be made from black and white (grayscale) data.

As mentioned above, backlighting or illumination of display device 104 may be increased to increase the gamut output of display 104 or to reduce exposure times. More than one back lighting or illumination units are contemplated by the present invention and may be included with or coupled to each display 104. The illumination brightness, frequency, and the like, of illumination units may also be controlled by controller 106. Further details regarding the various embodiments are discussed below.

Figure 2:
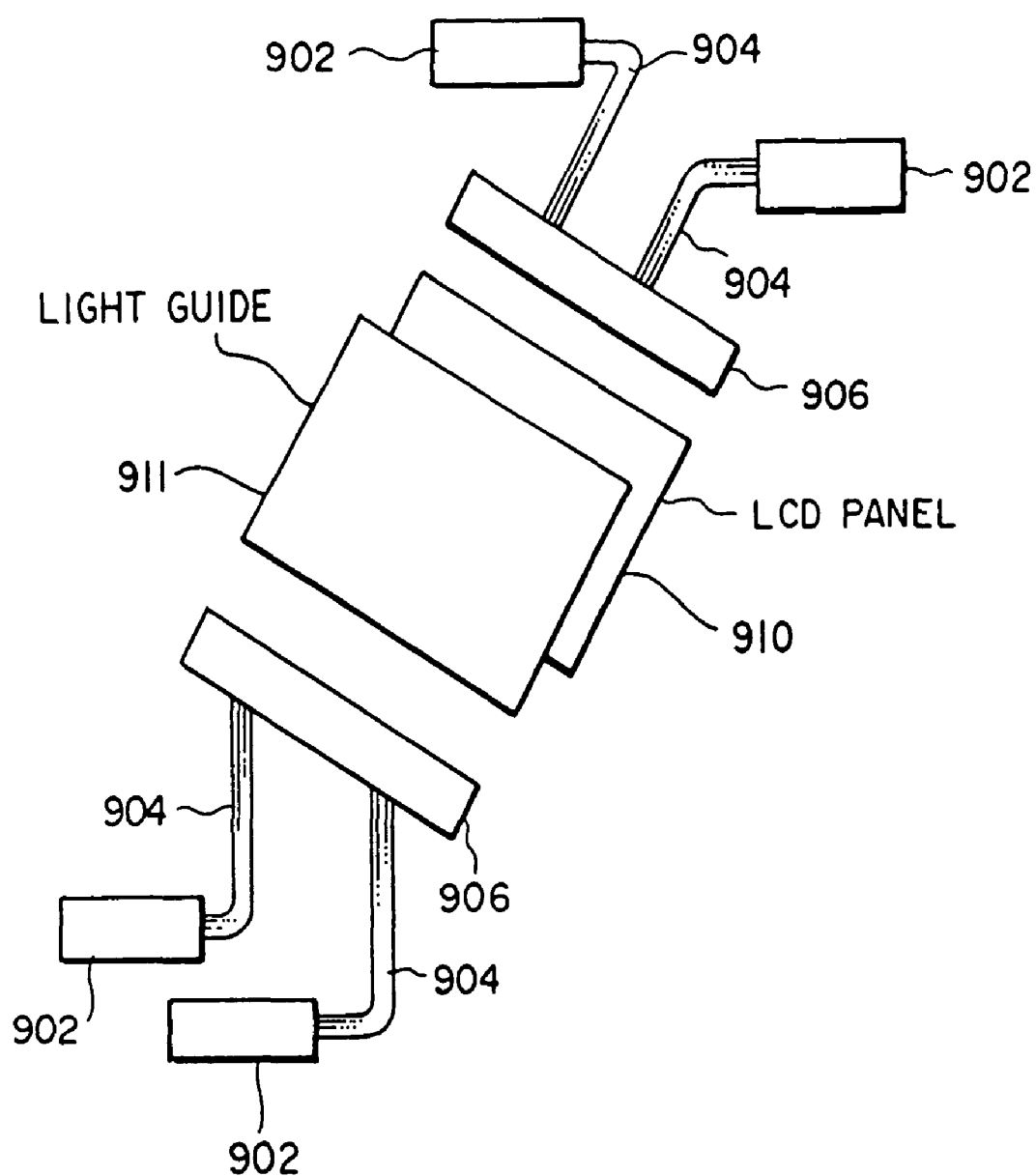
FIG. 2 illustrates an embodiment of an illumination source according to an embodiment of the present invention.

FIG. 2 illustrates an embodiment of an illumination source according to an embodiment of the present invention. In one such embodiment, light emitting diode (LED) lamp houses may be used as a back-lighting illumination source.

In one example, multiple LED lamp houses 902, may each include a Red LED, two Green LEDs, and a Blue LED; in another example, or LED lamp houses 902 may include more than one white LED. In this embodiment, an input from each LED lamp house 902 is directed to a display panel (device) 910 via fiber optic cables 904 and one or more light guides 906.

In the embodiment illustrated in FIG. 2, fiber optic cables 904 optically couple lamp houses 902 to light guides 906. Further, in this embodiment, a first light guide 906 is positioned on a top vertical edge the display panel 910 and a second light guide 906 is positioned on the bottom vertical edge of display panel 910. One skilled in the art will understand that additional light guides 906 may be used and be positioned on any opposite sides of display panel 910, such as the left and the right edges of display panel 910.

In this embodiment, light guides 906 are optically coupled to a light guide 911, that is typically positioned at the rear of display panel 910. In such a configuration, light guide 911 acts as both a light guide and a light diffusing source.

In the present embodiment, display panel 910 includes red, green, and blue filters for each pixel. In one example, the wavelength of light transmitted by each filter is on the order of: 650 nm for the red filter, 550 nm for the green filter, and 450 nm for the blue filter. In another example, the wavelength of light transmitted is approximately 630 nm for the red filter, 530 nm for the green filter, and 445 nm for the blue filter. In other embodiments, different peak wavelengths are contemplated. In the CMY color space, the peak wavelengths of light may be similar.

In the present embodiment, the additional illumination sources, such as LEDs are configured to produce light at the same peak frequencies as the red filter, green filter, and blue filter. This may be done in a variety of ways, such as via filtering the additional illumination sources. For example, filters may be integrated into lamp houses 902, light guides 906, or the like. In another example, filters, such as band-pass filters, broadband notch filters, or the like, may be incorporated as one or more filters in front of the lens of display device 910.

In other embodiment, LEDs or other types of lighting sources may provide supplemental lighting to existing lighting of display device 104 or only provide backlighting illumination to display panel 910. In one embodiment LEDs from Lumileds Lighting, San Jose, Calif. are used. In an additional embodiment, the amount of illumination may be increased in order to decrease the required exposure times, and to increase the quality of image transfer. In some embodiments, the increase in illumination is associated with increased heat. In such cases, a cooling system (air and/or fluid) may be used to compensate for the additional heat from the backlighting.

In another embodiment, a cold cathode illumination source typically used as a back lighting source for liquid crystal displays, may be replaced or enhanced with xenon (or other noble gas) stroboscopic elements. An exemplary stroboscopic device invented by one of the inventors of the present patent application, is described in U.S. Pat. No. 5,771,109, (the '109 patent) entitled METHOD AND APPARATUS FOR DIGITIZING FILMS USING A STROBOSCOPIC SCANNING SYSTEM, the contents of which are incorporated herein by reference for all purposes. The '109 patent describes a novel device configured for digitizing film, rather than recording. Therefore, the concepts discussed does not directly address the issues addressed by the present patent disclosure.

In some embodiments of the present invention, the cold cathode illumination sources of TFT LCD displays provides a limited exposure range, therefore limiting overall frame recording times. Thus, by including stroboscopic lamp houses, and the like for various embodiments, the film exposure times may be reduced, accordingly the overall recording times are also reduced.

Figure 3A:
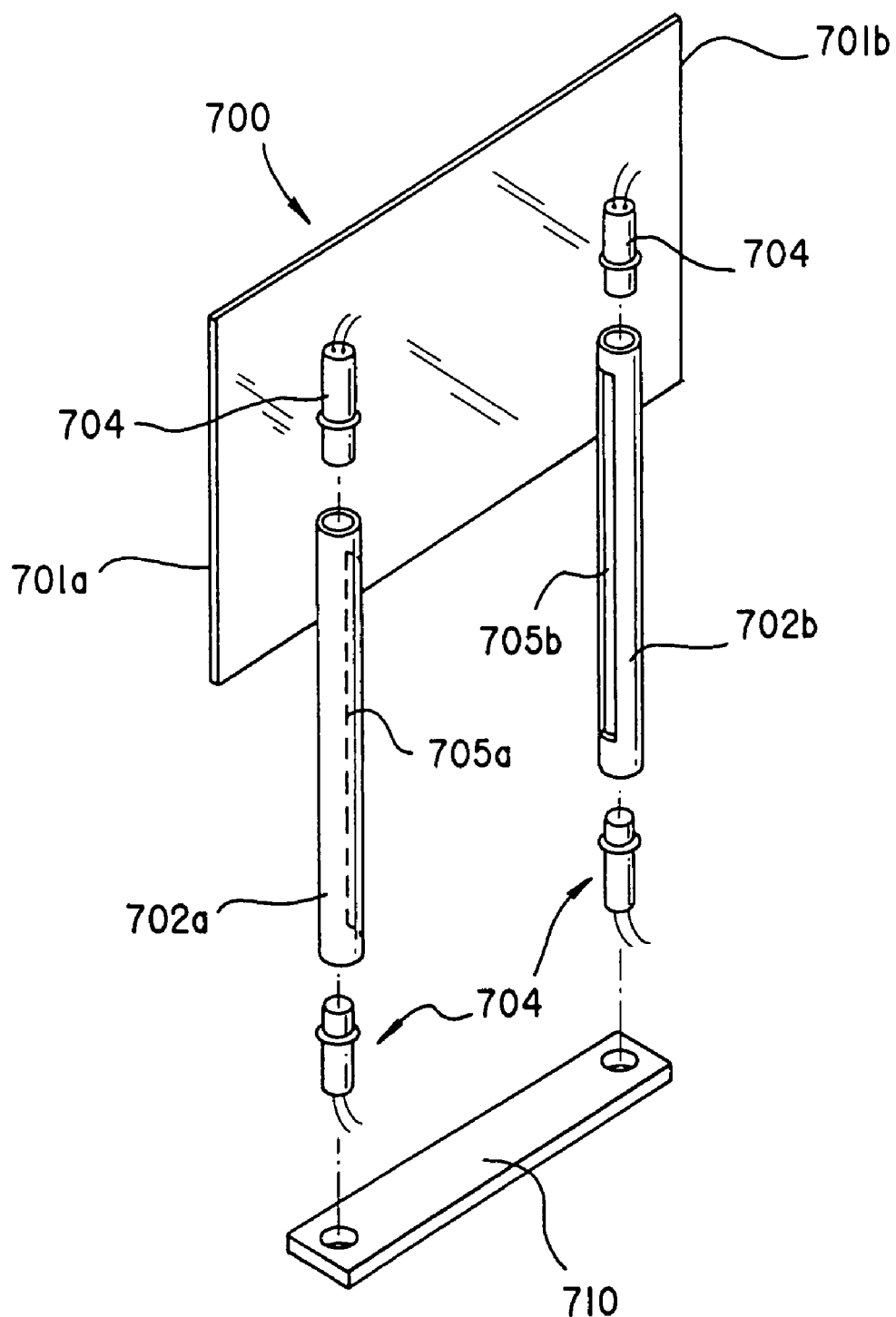
Figure 3B:
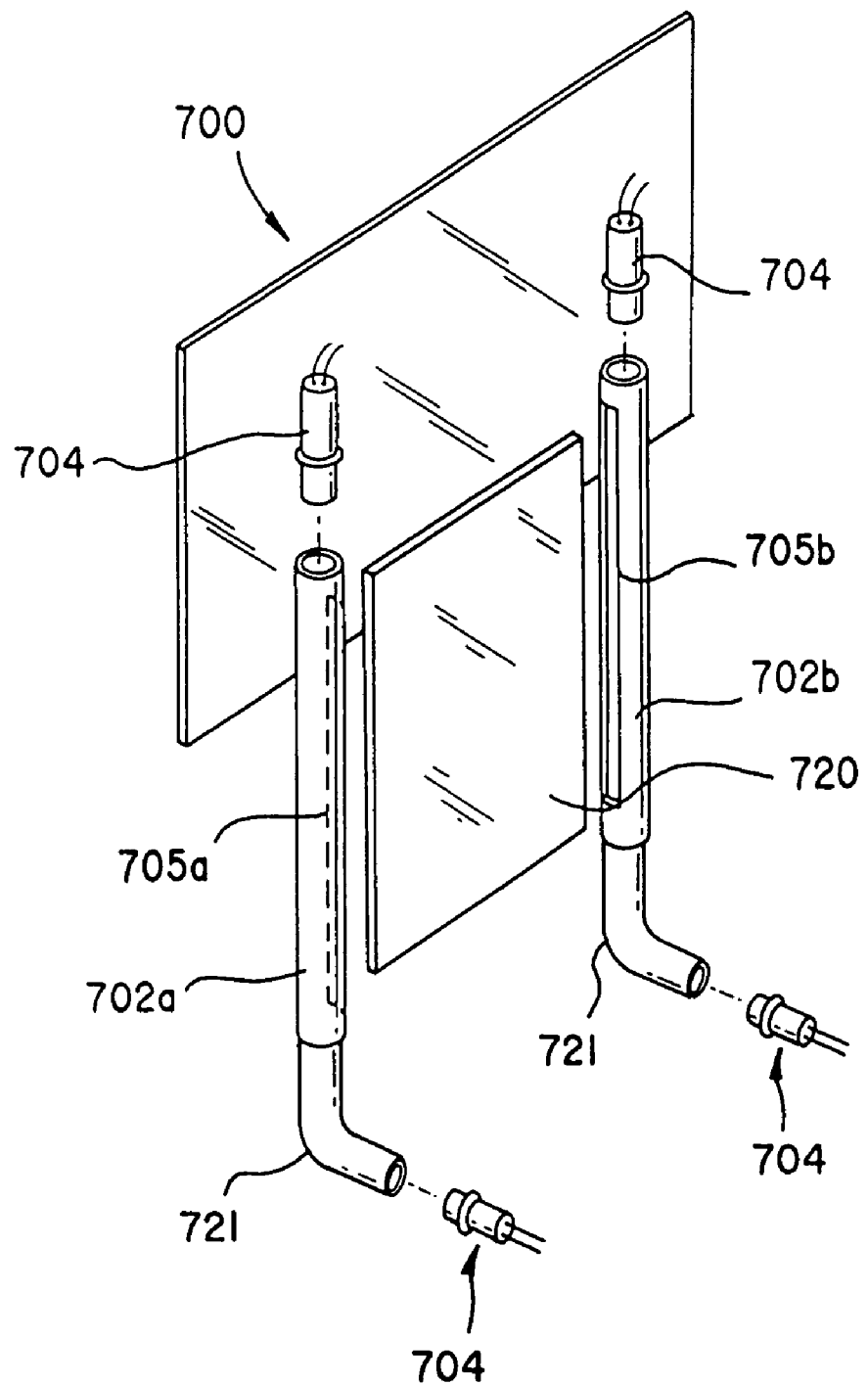

FIGS. 3A-C illustrate additional embodiments of a display device according to the present invention. More particularly, FIGS. 3A-C illustrate an LCD display configured with stroboscopic backlighting elements for application in film recording. A stroboscopic adaptation to an LCD display device 700 is shown in one embodiment as cylinders 702a, 702b. In one embodiment, the interior surfaces of cylinders 702a and 702b are approximately 95-99% reflective white or gold coating. For example, one such coating is available under the trade name Spectraflect from Labsphere, North Sutton, N.H. Cylinders 702a and 702b are illustrated with openings 705a, 705b that are approximately the same size as the height or width (ends) 701a, 701b of TFT LCD panel.

In the present embodiment, at each end of cylinders 702a, 702b are positioned ultraviolet (UV) filtered 1-4 joule xenon strobe lamps 704. In one embodiment, xenon strobe lamps 704 are EG&G FX 240 flash tubes including ultraviolet filters, and triggered by FY 712 triggers. In other embodiments, other stroboscopic sources may adapted for use herein. In another embodiment, fewer than four strobes are provided, such as two.

In one embodiment, illumination cylinders are positioned at opposite sides of the LCD display device, for example at the top and bottom; or left and right side of the LCD panel 700. These configurations provide lambertian (diffuse) distribution of the light over the surface of the active color LCD panel 700. In one embodiment, the distance from the light pipes (illumination cylinders) is approximately 3-6 mm from the edge of the LCD Panel 700. Illumination of LCD panel 700 with stroboscopic lamp houses typically provide more photonic power than typical fluorescent lights. Accordingly, exposure time of film media exposed to LCD panel 700 is decreased and film throughput is increased.

In the embodiment illustrated in FIG. 3A a holder 710 fixes the distance between illumination cylinders 702a, 702b. In other embodiments, holder 710 may allow for the repositioning of illumination cylinders 702a and 702b with respect to each other, and with respect to LCD panel 700.

As described above, with each lighting arrangement for each display device, color may be provide in a variety of ways, such as: via color filters which may be disposed between backlights and the display, in between the display and the lens of the film recorder, between the film and the lens of the film recorder, or the like. Color may also be provided by the LCD display itself and/or via control of the digital images. Color may be also be provide via LED backlighting. The embodiments described above may be combined with any of these color schemes to achieve a desired gamut output and brightness exposure.

FIG. 3B illustrates another embodiment of a stroboscopic illumination source for an LCD display device, or the like. As illustrated in FIG. 3B, the components and arrangement may be similar to those shown in FIG. 3A. However, in this embodiment, the openings 705a, 705b of cylinders 702a, 702b, respectively, are sized to a light pipe/guide 720. In one embodiment, the light pipe/guide may be the one provided by the LCD display device manufacturer for illumination purposes, and in another embodiment, light pipe/guide 720 may be custom made for the present application.

In the above embodiment, strobe lamps 704 are placed within the same axis as cylinders 702a and 702b. In another embodiment, "elbow" light pipes 721 may be provided. These elbow light pipes act as light integrators, and also allow strobe lamps 704 to be positioned perpendicular to cylinders 702a and 702b.

FIG. 3C illustrates another embodiment of the present invention. This embodiment may be similar to the embodiment illustrated in FIG. 3B.

In this embodiment, a light pipe/guide is provided having one or more prismatic elements 708 on the edges. These prismatic elements 708 typically run along the entire length of the light pipe/guide.

As illustrated in FIG. 3C, illumination sources corresponding to primary color components of the LCD display are also provided. In one embodiment, each illumination source may include a cylinder and an opening as described in FIG. 3B. Further, for each cylinder, one or more stroboscopic illumination sources may be provided. Any conventional filtering media may be then provided within the cylinders so that the appropriate wavelength of light is transmitted by each cylinder.

FIGS. 3D-F illustrate additional embodiments of the present invention. In particular, FIGS. 3D-F show various views of additional embodiments of an LCD display device configured with additional stroboscopic backlighting elements for application in film recording.

FIG. 3D illustrates a first embodiment of an integrating light box 710, which may be used with, for example, the LCD panel 700 of FIGS. 3A-C. In this embodiment, one or more probe apertures 711 are provided to integrating light box 710. Further, stroboscopic illumination sources, such as strobe lamps 704 discussed in FIGS. 3A-C, are inserted into apertures 711. In one embodiment, integrating light box 710 may be positioned directly behind LCD panel 700 to provide the illumination.

Similarly, FIGS. 3E-F illustrate side and perspective views of additional embodiments of an integrating light box 715. In one variation of this embodiment, as shown in FIGS. 3E-F, the LCD panel 700 is contained within a frame 716. Additionally, a pre-pan 718 and a reflector pan 719 are optically placed between the LCD panel 700 and a integrating light box 715. In various embodiments, integrating light box 715 includes various arrangements of one or more probe apertures 720, as illustrated. One or more strobe lamps, similar to strobe lamps 704, are typically inserted into probe apertures 720, to provide the illumination.

The inventors of the present inventions believe that embodiments described above utilizing stroboscopic backlighting have advantages over possible embodiments where back lighting is constantly on. More specifically, it is believed that embodiments using stroboscopic elements have a greater lifespan because as a light source, stroboscopic elements do not heat LCD panel 700 as much as other light sources such as LED sources. Additionally, because the lighting provided by the strobes is ON for less time, the color filters in LCD panel 700 will be less affected by fading.

Another significant issue determined by the inventors is the issue of cooling. In embodiments with "always ON" illumination, such as with LEDs, digital light projectors (described below), the heat produced by such embodiments is large. Methods to cool such illumination devices may be used, such as with fans, liquid cooling, air conditioning, and the like. Disadvantages to fans include that particulate matter may be blown about the room, and dust particles may adhere to the LCD panel, camera lens, film media, and the like. Further, providing a dedicated air conditioning unit to cool the illumination sources is expensive. By using strobes, the heat produced by the system is greatly reduced.

FIG. 3G illustrates another embodiment of the present invention. This embodiment includes a recording device 730, a display device 740, and a digital light projector 750. These elements may be mechanically coupled via a track 760 and adjusted relative to each other using the same or similar techniques described in the various embodiments, above.

Digital light projector (DLP) 750 is typically a high intensity image projection device, as is currently known in the industry. In the present embodiment, DLP 750 is used to provide the backlight illumination for display device 740. In various embodiments, the resolution of current DLPs range from 800×600 to 1280×1024. In the future, the inventors expect to be able to use higher resolution DLPs, when available, in various embodiments of the present invention. In one embodiment, a Compaq MP4800 or HP VP 6120 DLP may be used. In other embodiments, DLPs from other vendors such as InFocus, Sony, Panasonic, or the like, may be used. The brightness output of typical DLPs currently range from 700 to 15,000 lumens, or greater. Further, the output contrast ratio currently range from 200:1 to 3000:1, or greater.

In the present embodiment, all metal and plastic housings for display device 740 are removed. Further, the internal lighting source, light pipes, and the like may also be removed. In this embodiment, display device 740 may be based upon a liquid crystal display panel, such as one of the ones described above.

In one embodiment, digital light projector 750 and display device 740 are both coupled to a source for images, CPU 770. Both digital light projector 750 and display device 740 are typically driven with the same source images (e.g. full-color images). In other embodiments, the resolution of images provided to DLP 750 and display device 740 may be different (but still full-color image). In still other embodiments, DLP 750 may output monochromatic images.

Figure 3H:
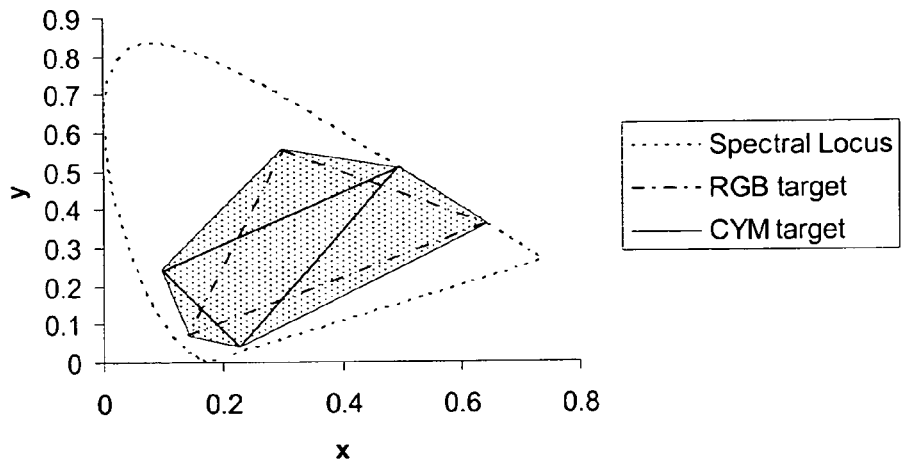
Figure 3I:
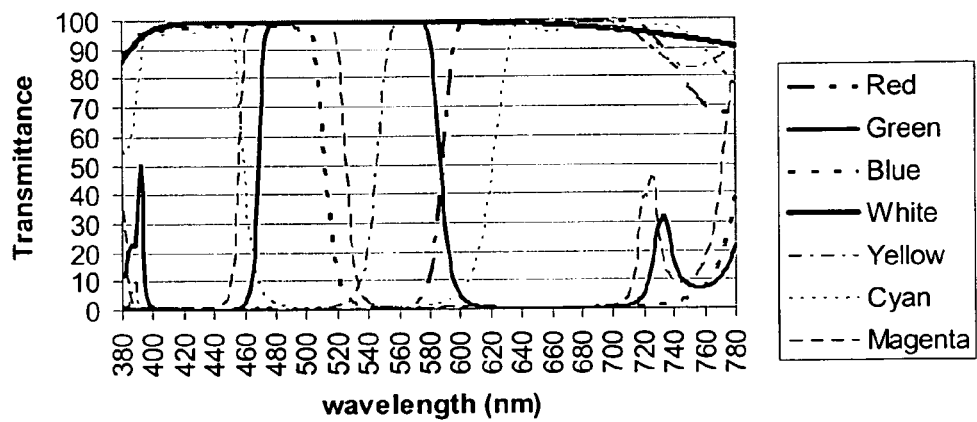

In another embodiment, multiple DLPs can be used (with or without neutral density filters) to provide the backlight illumination for display device 740. In one embodiment, three (3) DLPs can be stacked on top of each other, the outputs aligned, and each DLP simultaneously project images to the back of display device 740. In one embodiment, each DLP outputs primary and complementary colors resulting in a hex chromatic color system, thereby increasing or expanding the color gamut. FIG. 3H illustrates a representative color gamut for a image driven using RGB signals and a representative color gamut for an image driven using complementing CYM signals. The sum of the shaded areas represent the color gamut of the new hex chromatic color system. FIG. 3I illustrates a transmittance versus wavelength graph with a hex chromatic color system, as described above.

In one embodiment using three DLPs, a first DLP may project red and cyan, a second DLP may project blue and yellow, and a third DLP may project green and magenta. To implement such embodiments, color filters in each respective DLP may be modified to display the complementing colors. It is contemplated that typical wavelengths of light are R=650 nm, G=550 nm, B=450 nm, C=480 nm, M=680 nm, Y=580 nm. In the present embodiment, each respective DLP may be driven with the source image that is separated into complementing color pairs with one or more video graphics boards. To provide the complementing color outputs, each DLP is typically fitted with a custom color wheel. A manufacturer of such color wheels is Unaxis Optics, Golden, Colo.

In another embodiment, two (2) DLPs can be stacked on top or near each other, the outputs aligned, and each DLP simultaneously project images to the back of display device 740. In one embodiment, each DLP also outputs colors to a hex chromatic color system, thus the color gamut is greatly increased. In one example, a first DLP may project red, green, and blue images, and a second DLP may project cyan, yellow, and magenta images.

Figure 3J:
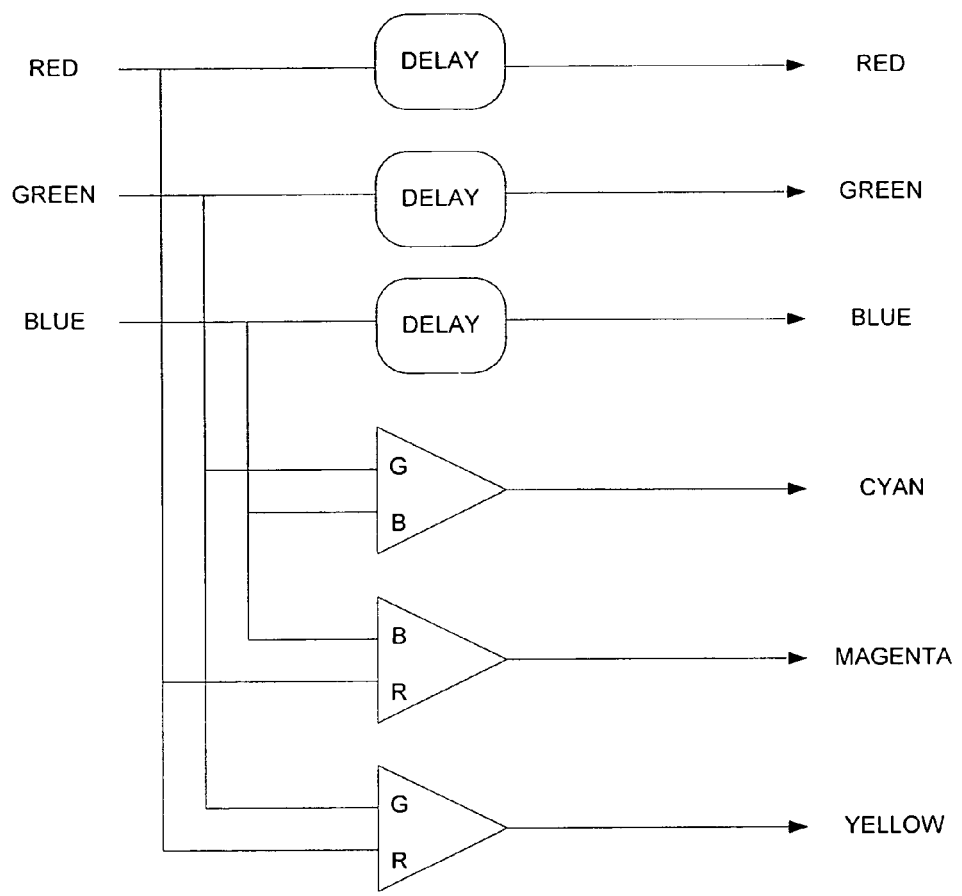

To implement a system having two DLP illumination systems, color filters in only one of the DLPs need to be modified to display the CYM colors. In one embodiment, one or more video graphics boards may be driven with the same source image, and be programmed to output RGB signals separately from CYM signals. FIG. 3J illustrates a simple implementation of a circuit that may be used to receive RGB signals, and to output both RGB and CYM output signals. It is contemplated, that in one embodiment, a graphics board may be programmed to provide this functionality, and in another embodiment, this circuit is separately implemented on the video graphics boards.

As noted above, in various embodiments, the output resolutions of DLP 750 and display device 740 are typically different. Further, the resolution of the source images driving digital light projector 750 and driving display device 740 are also different. In one embodiment, CPU 770 typically includes one or more video cards for driving the one or more DLPs 750 and a separate video card for driving display device 740. For example, in a multiple DLP system, each DLP may be driven by a separate video card that is different from the video card used to drive display device 740. In other embodiments of the present invention, as DLP technology increases, the resolution of the source images driving digital light projector 750 and driving display device 740 may be the same or substantially similar. Accordingly, a single video card may be able to drive both display device 740 and the DLPs 750, in future embodiments.

An issue of a resolution mismatch between DLP 750 and display device 740 occurs. For example, in one example, display device 740 may have a maximum resolution of 3480× 2400, whereas DPL 750 has a maximum resolution of 1280× 1024. Even if display device 740 is driven using spatial dithering techniques (4 pixels to 1), described above, the effective resolution of display device 740 may be 1740×1200, which is still greater than the maximum resolution of DPL 750 1280× 1024. In one example, every one pixel of DLP 750 may illuminate, for example, four pixels of display device 740. In other examples, other ratios are contemplated, such as one pixel of DLP 750 illuminating 16 pixels, 12 pixels, 81 pixels, etc. of display device 740, 9 pixels of DLP 750 illuminating 16 pixels of display device 740, and the like. In various embodiments, the area of illumination need not be square, but may be rectangular, hexagonal, oval, or the like.

In the present configuration where one or more DLPs 750 are used to illuminate display device 740, one may expect that the resolution mismatch between these devices would unacceptably degrade the resolution of the image captured by recording device 730. However, instead, the inventors of the present invention have discovered that the advantages provided by this novel configuration outweigh such concerns. Advantages of having one or more DLPs 750 as an illumination sources include a dramatically brighter image. Further, having one or more DLPs 750 as an illumination source may provide high contrast ratio illumination, thus the film may record a higher range, higher gamut image; and the like.

In light of the above, embodiments of the above that include one or more DLPs provide a greatly improved display device for visual inspection of the images. Further, embodiments described above may also provide an improved display for transferring or recording images to camera film. When used as a display for transferring images, the power supply of the one or more DLPs may have to be DC regulated with a feedback loop in order to keep the amount of illumination steady over different image frames. However, when used as a mere display device, DC regulation is not necessarily required.

In embodiments of the present invention, to reduce potential fading of color filters in display device 740, UV filters may be included.

In FIGS. 3A-3F, the illumination sources were described as providing lighting for the entire display. The embodiments in FIG. 3G introduces the notion of an addressable light source, i.e. lighting "pixels" that can be independently turned ON and OFF at virtually any frequency. In light of this disclosure, one of ordinary skill in the art will now recognize that embodiments of the illumination sources described in conjunction with FIGS. 3A-3F may also include addressable lighting components. As an example, in the embodiment illustrated in FIG. 3D, a greater number of strobe lamps or LEDs may be provided. Further, each of the strobe lamps or LEDs may be independently addressable, i.e. turned ON and OFF independently from other strobe lamps or LEDs, to provide lighting to different portions of the display. As an example, an addressable grid of LEDs may be provided as an illumination source. The grid may include 480 LEDs horizontally and 256 LEDs vertically that are individually addressable. The LEDs may be "white" color LEDs. In an alternative embodiment, the LEDs may be colored.

Figure 4:
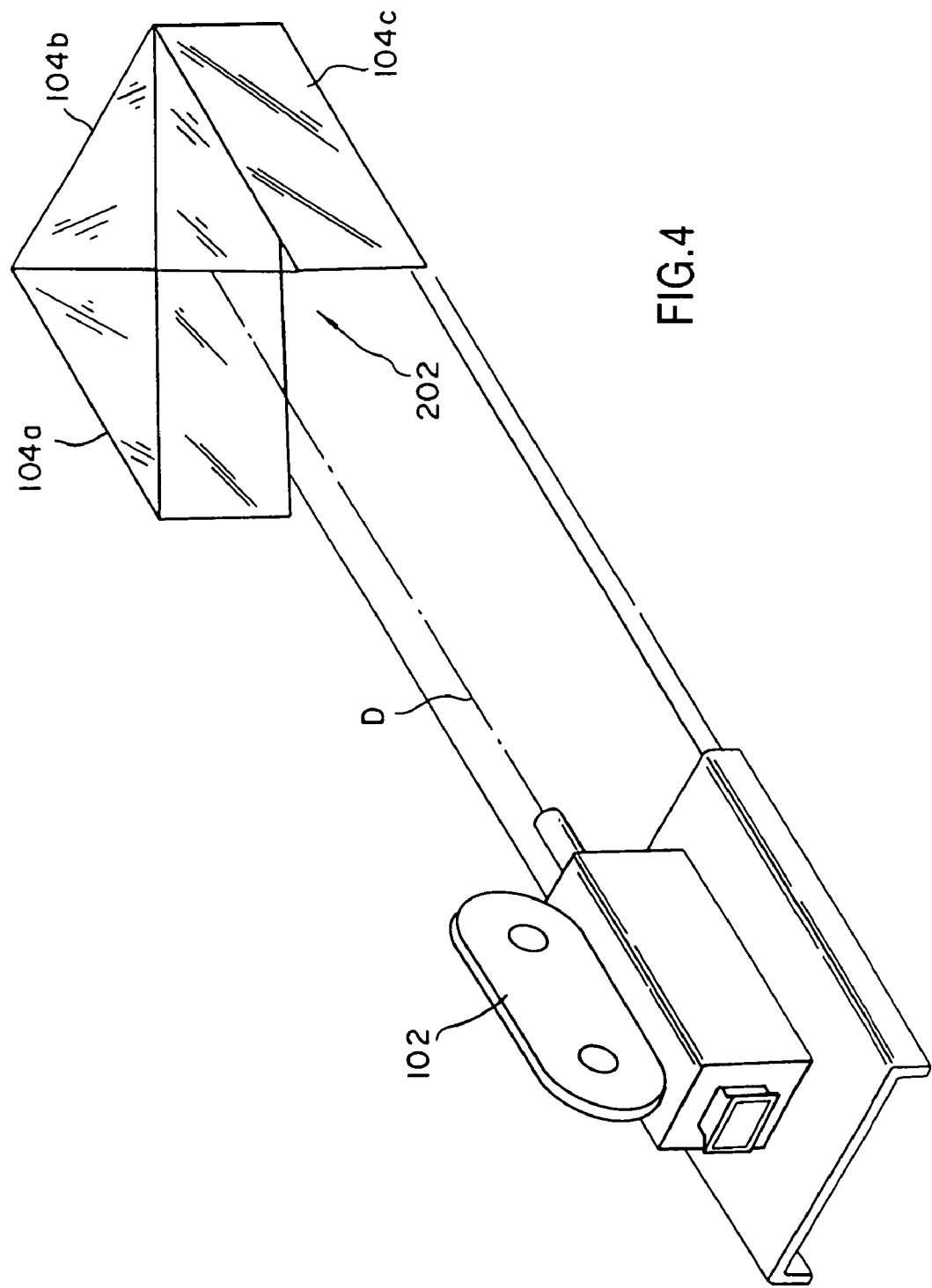
FIG. 4 illustrates another embodiment of the present invention.

FIG. 4 illustrates another embodiment of the present invention. In particular, FIG. 4 illustrates digital film recorder utilizing multiple flat panel displays. In various embodiments, the components used may be similar to those described above with reference to FIGS. 1A-1B.

In the present embodiments, images are recorded onto film from three displays at the same time via a beam splitter. The three displays are typically assigned a color from the color components primaries, for example, red, green, or blue; or cyan, magenta, yellow; or the like. In the present embodiment, each display is typically responsible for outputting images in a single color component. Beam splitter 202 is employed to combine the images from each display and provide the combined image towards the lens of the recording device 102. In embodiments of the present invention, monochromatic displays may be used along with appropriate filtering material to achieve a color component output for each display.

In various embodiments, display devices 104a-104c may include LCD displays, plasma displays, OLED displays, and other types of flat-panel display technology.

In the present embodiments, a controller or CPU 106 similar to that described above may be coupled with the recording device 102 and the display devices 104a-104c. In this example, controller 106 can adjust the positioning and orientation of the optical acquisition device, properties of the acquisition device (e.g. film advance, exposure time), parameters of display devices 104a-104, and the like. Because three display devices are used in this embodiment, the amount of light provided to the film recording device is greatly increased. Accordingly, the exposure times for typical film media are advantageously reduced.

In various embodiments, display devices 104a-104c may be simultaneously illuminated, sequentially illuminated, or the like. Additionally, display devices 104a-104c may be simultaneously driven by controller 106 or sequentially driven by controller 106 with respective images. In light of the above disclosure, one of ordinary skill in the art will readily understand that aspect ratios, exposure characteristics, film formats, and the like may be changed by adjusting the distance D between the optical acquisition device one or more display devices, the type of backlighting illumination, if any, of each display device, and the like.

Figure 5A:
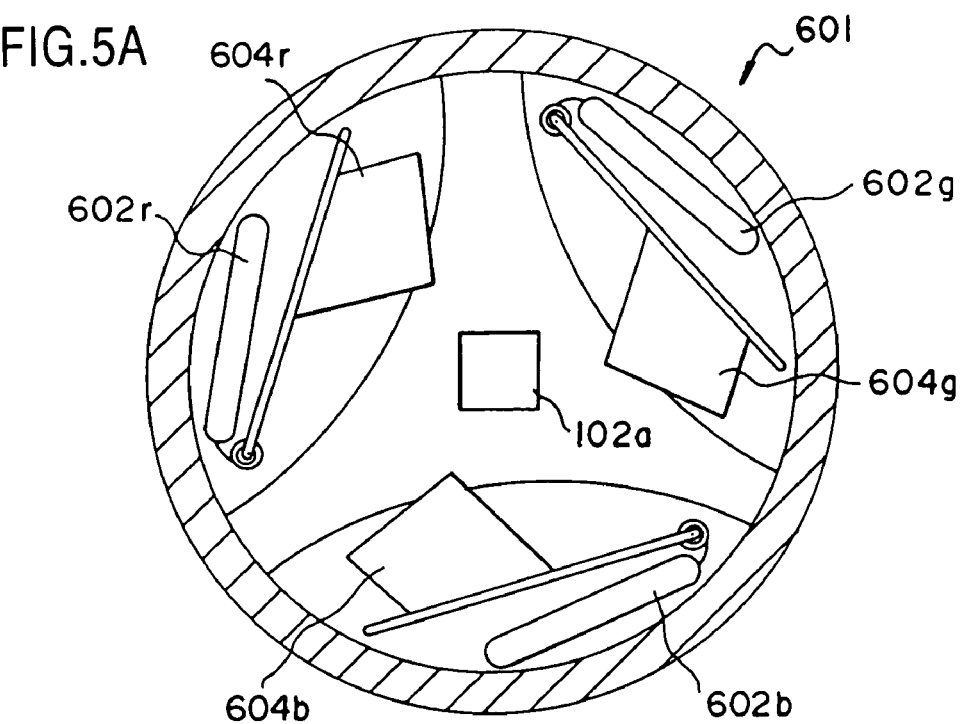
FIGS. 5A-C illustrate embodiments of the present invention.
Figure 5B:
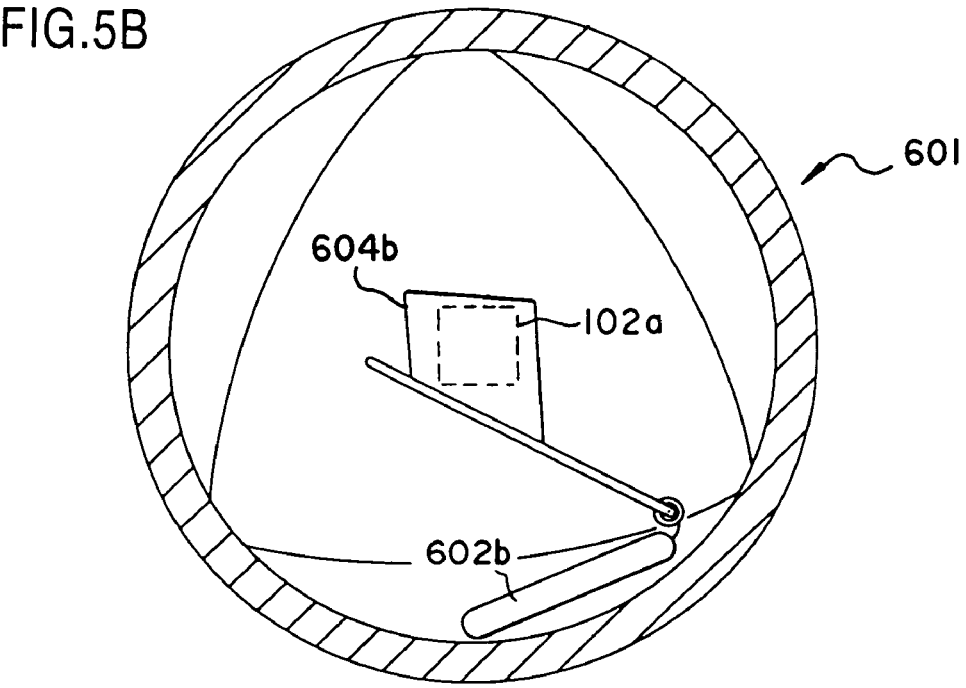
Figure 5C:
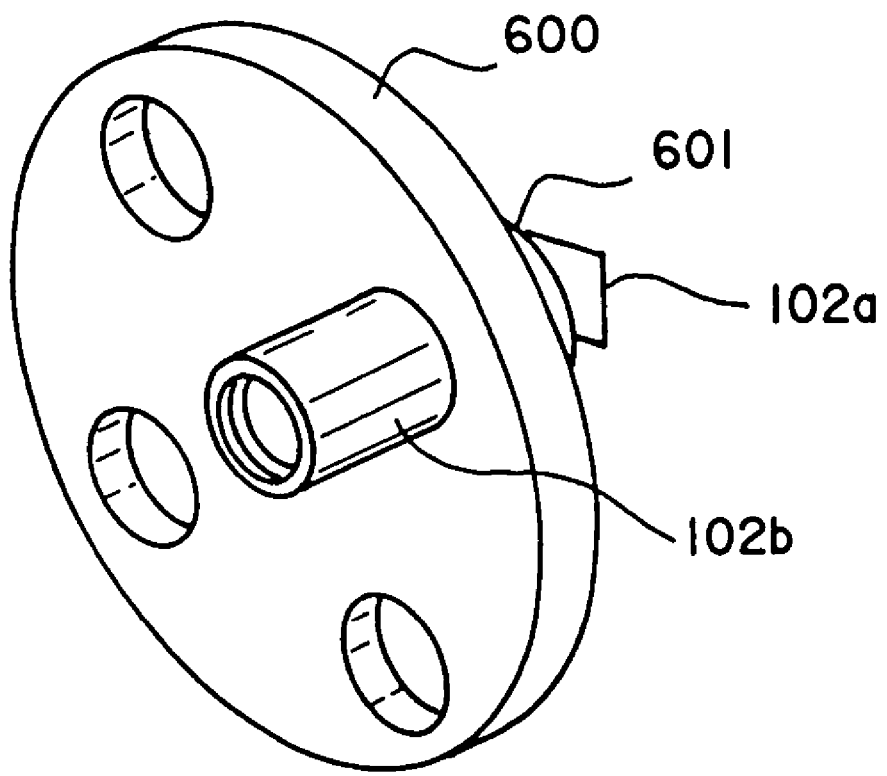

FIGS. 5A-C illustrate additional embodiments of the present invention. In particular, FIGS. 5A-C illustrate embodiments of a "color filter wheel" where color filters are placed between a display device and the optical recording media. In one embodiment, the color filter wheel may be placed in an optical axis in front of a lens (camera aperture 102a) of a recording device, may be placed in the film plane, or the like. This aspect is particularly useful in embodiments where a monochromatic display device is used, or where separate color component images are exposed to film media in a sequential manner, or the like.

In the embodiments illustrated, one or more nano-motors are used to move the color filters into a proper position, within the optical axis of recording device, as illustrated in FIGS. 5A and 5B. A general orientation of the color filter wheel relative to a camera lens is illustrated in FIG. 5C.

In the embodiments illustrated in FIGS. 5A and 5B, a nano-filter ring 601 includes a number of nano-motors 602r, 602g, and 602b. In this example, each nano-motor 602r, 602g, 603b is a linear device that has a pivot and a spring to actuate an arm with a color component filter 604r, 604g, and 604b mounted to the end of the arm. This makes a flag-like configuration. Nano-motors 602r, 602g, and 603g are used to control the position of the color component filters 604r, 604g, 604b, respectively, e.g. RGB filters, CMY, or the like.

In this embodiment, a pivot point for each arm positioned away from the motor. A small cable is then attached between the motors and each arm such that the cable is pulled by the linear motion of the nano-motor. A spring can provide a bias for the color filter to be retracted away from the camera aperture 102a.

In operation, in one embodiment, one of filters 604r, 604g, 604b, is selectively pulled into the filter ON position, aligned to optical axis 102a. An example of this is illustrated in FIG. 5B, where filter 604b is pulled over camera aperture 102a. After this, the display device may be illuminated, and the recording device may open its aperture to expose the film media; next, filter 604r is pulled over camera aperture 102a, and similar to above, the film media is exposed; next, filter 604g is pulled over camera aperture 102a, and similar to above, the film media is exposed.

In light of the present invention disclosure, it is believed that one having ordinary skill in the art of nano-science will readily understand that the dimensions and configuration of the nano-device may be varied to fit the device properly into a variety of camera lens interfaces. Further, many different such devices may be adapted for use in conjunction with the above embodiments.

FIG. 5C shows an embodiment of nano-filter ring 601 relative to a standard turret 600, lens 102b, and aperture 102a of a typical recording device. In other embodiments, nano-filter ring may be placed in-front of lens 102b, at the image plane, or the like. In still other embodiments, in general color filters may be disposed virtually anywhere in the optical path from display device 104 and the film media. Additionally, the color filters may be located in front of the illumination sources.

FIG. 6 illustrates a diagram of a flow chart according to an embodiment of the present invention. More particularly, FIG. 6 illustrates a general method for recording digital images onto a film.

Initially, a flat panel display and a film recording device are provided, step S300. In embodiments of the present invention, the flat panel display and the film recording device may be constituted or configured as described above.

Next, the display area (active area) of the flat panel display is aligned with the recording input (i.e., lens, optical axis) of the film recording device, step S302. As described in the various embodiments above, and illustrated in FIG. 1A, various relative adjustments between the film recording device and the flat panel display may be made including, adjusting the distance "D," adjusting the relative pan, tilt, roll, height, side-to-side orientations, and the like. To assist in this process, as well as for focusing, one or more test patterns may be displayed on the display area of the flat panel display. The test patterns may be viewed through an optical or electronic viewfinder of recording device, or recorded onto the film media, developed, and analyzed, or the like.

In the present embodiment, a controller drives display device with the images that are to be recorded onto the film media, step S304. In this example, each image is displayed on the display device for a specific amount of time. More specifically, the display time may be pre-determined to be the same for each image (i.e. image independent, t0=t1=t2 . . . ), or the time period may be chosen to properly expose the film with the correct brightness (i.e. image dependent; t0>t1, t1>t2, . . . )

Next, at step S306, the frame of film is exposed to the image displayed on the display device for the specified time period. In this embodiment, a controller may control when the recording device shutter is opened and closed, thereby controlling the particular exposure time period. In this example, the exposure time may be pre-determined to be the same for each frame (i.e. frame independent), or the time period may be chosen to properly expose the film with the correct brightness (i.e. frame dependent).

In alternative embodiments of the present invention, steps S306 and S304 may be reversed. In such a case, the camera shutter is first opened, the images are displayed on the display device, and then the shutter is closed.

In the embodiment illustrated in FIG. 6, after exposure, the film is advanced to the next frame, step S308, and steps S304 and S306 may be repeated to display and record the next image.

In other embodiments, steps S304 and S306 may be repeated several times before the film is advanced in step S308. Such embodiments are especially applicable when component color images are sequentially exposed to the film media. For example, in embodiments, such as the ones illustrated in FIGS. 5A-C, a red filter is positioned at aperture 102a; a red component image is displayed on the display device and then the film media is exposed; the filter is changed to green; then a green component image is displayed on the display device and then the film media is exposed; the filter is changed to blue; then a blue component image is displayed on the display device and the film media is exposed; and then the film media is advanced.

In the embodiments of FIG. 6, steps S304 and S306 may either provide sequential color component exposure or simultaneous color component exposure before the film is advanced in step S308.

In still other embodiments, control of the exposure in step S306 may be performed in black and white, CMY or RGB formats through the use of filters, display control, backlighting adjustments, or the like. In still other embodiments, conventional color filter wheels may be used.

Figure 7:
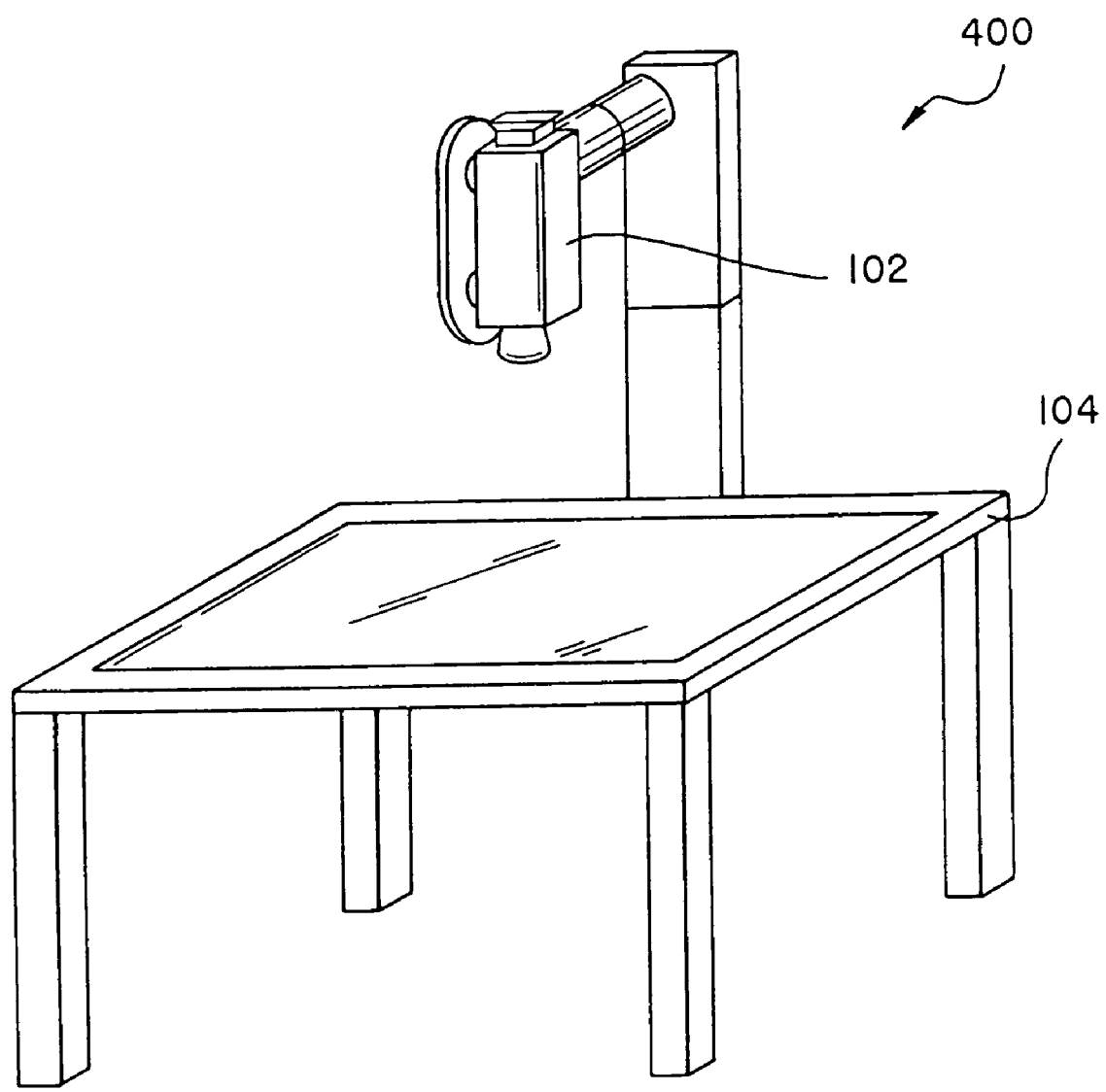
FIG. 7 illustrates another embodiment of the present invention.

FIG. 7 illustrates another embodiment of the present invention. More specifically, FIG. 7 illustrates that an optical recording system may be configured in a vertical orientation that the inventors term an "up shooter" or "down shooter" modes.

FIG. 7 illustrates a down shooter style digital film recording device. Down shooter 400 may include a recording device 102 vertically aligned over a flat panel display 104. In this embodiment, film recording device 102 may be vertically adjustably aligned in order to obtain a proper focus of the display area of display 104. Any of the above embodiments may be configured as an up-shooter or down-shooter.

Similar to the embodiments above, display device 104 may be coupled with a CPU for providing images to be displayed thereon. In this embodiment, the CPU may also be coupled with the recording device 102 in order to provide the adjustments to recording device 102 similar to those described above. In these embodiments, additional cooling units may be used to cool illumination sources that are disposed underneath the display device.

Figure 8A:
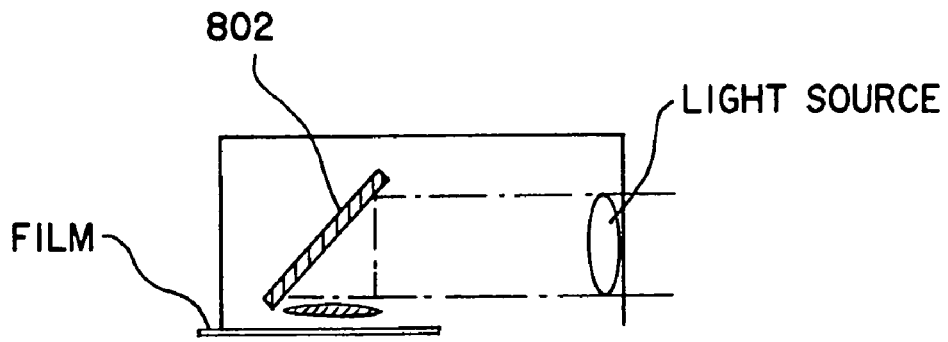
Figure 8B:
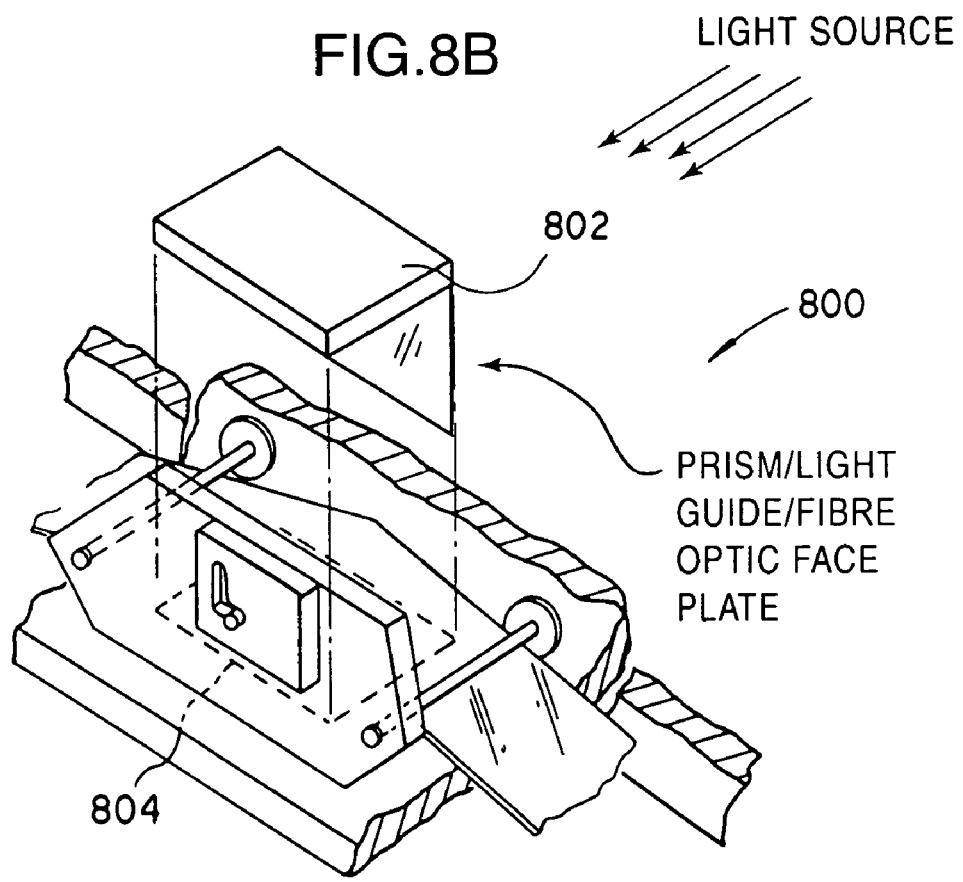

FIGS. 8A-C illustrate additional embodiments of the present invention. In these embodiments, a "direct contact" film exposure process is disclosed using a miniature display device or a miniature reflective projector device. Unlike some of the embodiments above, a large, separate display device is not used. Further, camera lenses are not required.

Illustrated in FIG. 8A is a recording device 800. In this embodiment, a display device 802 is provided with images from a controller, or the like, in a manner previously described. In response, display device 802 displays images.

In one embodiment of the present invention, display device 802 is a Silicon Crystal [X-tal] Reflective Display (SXRD) Chip from Sony, having, for example, a resolution of 1920 horizontal by 1080 vertical pixels. In other embodiments, display device 802 is a liquid crystal on silicon (LCOS) device having a resolution, for example, of 1920×1080 pixels. Various embodiments may include devices such as JVC's Direct Drive Image Light Amplifier (D-ILA), Hitachi's HDTV LCOS LCD Module, OCLI's UltreX™ Light Engine, or the like. In future embodiments, display devices 802 may have even higher resolutions. Currently, such chips can be made as small as 0.78 inches diagonal, in a 16:9 widescreen aspect ratio. It is envisioned that, in the future, similar devices from Sony or other manufacturers may also be used having different physical sizes. Further, other aspect ratios such as 2.35:1, 1.85:1, or the like, may also be used. Such devices are conventionally contemplated as "direct view" chips for eyepieces in cameras (e.g. HDTV), for projection television/monitors, for heads up displays (HUDs), and the like.

In embodiments where display device 802 may be an active device, i.e. self-illuminating, display device 802 may be positioned adjacent to the film media. More specifically, display device 802 may physically contact the film media, or be separated from the film media by a small space.

In one embodiment, display device 802 is placed directly over an aperture 804 of a recording device 806. One skilled in the art will understand that the aperture 804 and exposure time may be adjusted to attain desired effects, such as high speed printing, and to incorporate such other variables as the brightness of the display device 802.

In embodiments where display device 802 is supplemented with one or more separate illumination sources, it is contemplated that display device 802 be positioned closely to the film media, but not as close to the film media as described above. In one embodiment, a prism or a transparent face plate may be positioned between display device 802 and the film media. One or more light sources may be coupled to the transparent light plate to provide illumination to the front of display device 802. Various other mechanisms may be used to illuminate the face of display device 802, when display device 802 is a reflective device, including a prism (FIG. 8B), light guide, fiber optic face plate (FIG. 8C), and lens or the like. In cases where display device 802 is transparent, the light sources may be provided from the side, as above, but also from the back.

The various embodiments of the present invention described above are extremely well suited for transferring images from flat-panel display devices to optical media. In embodiments of the present invention, optical recording device is a movie camera and the optical media is movie camera film, intermediate movie film, or the like. In other embodiments, other media may also be used such as photo-sensitive paper, photo-sensitive media, or the like. In still other embodiments, noise issues are less of a concern, thus the optical recording device may be a still film camera, and the media may be still camera film, such as 4"×5", 8"×10", 6 cm×6 cm, 35 mm film or the like.

Further, in embodiments of the present invention, flat-panel display may be a flat-panel display based on any number of display technologies such as LCD, Plasma, OLED, EL, LCOS, or the like. Further, the image data driving the displays may be analog or digital data.

One specific application enabled by the above novel concepts is the transfer of images from a video stream to film media. The embodiments illustrated in FIGS. 1A-C and other figures may be used for this application. For example, system 100, may include a film recorder 102 that is coupled to a display driver (e.g. controller 106) and can receive video data from a video source (e.g. storage device 110) for output to display device 104. Examples of a video source may include any conventional video source (e.g., digital camera, digital video camera, disk, memory, etc.). In embodiments of the present invention, controller 106 may be provided with video capture capability with frame buffers. It is believed that conventional frame capturing products may be used, if desired.

In various embodiments, the video data may be digital or analog data. For example, the stream of video data may be in analog or digital display formats such as NTSC, PAL, SECAM; digital formats such as 720p (30 fps), 720i (24 or 60 fps), 1080i (30 fps), 1080p (24 or 60 fps), DV, or the like; further the data may be encoded into different encoding formats, such as computer and streaming media formats such as Windows WMV, AVI, MPEG (e.g. MPEG-1, MPEG-2, MPEG-4, MPEG-7, MJPEG), DivX, Apple QuickTime, RealOne RealMedia, H.261, H.263, and the like. The display format, e.g. resolution, fps, and the like, of video encoded in the different encoding formats may widely vary.

For each of the above video display formats, frames of video data are typically displayed onto a display, such as display device 104, one at a time. The number of updated video frames per time period (such as frames per second (fps)), is known or can be easily determined, and thus the amount of time a particular video frame should be output to a viewer can also be determined. It should be noted that the video update in terms of fps is not necessarily related to the refresh rate of the display device. That is, for example, if a video source can provide 15 unique video images per second, and the display device refreshes at 60 Hertz, the display typically displays each frame in the video four times.

In the present embodiment, film media is typically shot at approximately 24 fps, however, in other embodiments, other numbers of frames per second are envisioned.

In one embodiment, a first frame of video data is displayed and held on a display device for a set amount of time, e.g. 1 second. While this video image is displayed on the display device, the shutter of a film recording device, is opened, and the film media is exposed for an appropriate amount of time. These embodiments may be combined advantageously with one or more of the above embodiments, to increase the amount of illumination that strikes the film media, and therefore to decrease the film exposure times.

In one embodiment, the shutter is then closed, the next frame of video data is displayed on the display device (the display is updated), and the process repeats. This embodiment assumes that there is virtually a one to one match between the number of unique video frames per second and film frames per second. In some embodiments, for example with 720p or 1080p, the video output can be selected to be output at 24 frames per second. Accordingly, in such cases, no frame mismatch occurs. In general, it is desired, but not required, that the video output match the film frame rate of 24 fps.

In other embodiments of the present invention, a mismatch, such as interlace mismatch, may occur between the number of unique video frames per second and the film frames per second. This mismatch can be compensated using various techniques. As examples of frame mismatch, the video images may be updated at 30 frames per second compared to film at 16 fps; the video images may be updated at 20 frames per second compared to film at 24 fps; the video images may be updated at 5 fps compared to film at 8 fps; and the like. Problems arise with up-sampling or down-sampling of frames displayed per second. For example, if entire frames are dropped or added, to obtain the desired frame rate images would appear "jerky" and unsatisfactory.

In the present embodiments of video to film transfer, two situations arise with frame rate mismatch: one, where the number of frames per second of video is lower than the film frame rate; and two, where the number of frames per second of video is higher than the film frame rate.

In embodiments where the number of images per second needs to be increased for film, additional video frames can be "constructed" to match the film frames per second. In various embodiment, to construct additional frames, adjacent video frames can be "blended" together. As an example, if a video source provides 15 fps, and the film is shot at 24 fps, every 5 frames of video should be captured with 8 frames of film: film frame 1=video frame 1; film 2=blend of video 1 and 2; film frame 3=video 2; film 4=blend video 2 and 3; film 5=blend video 3 and 4; film 6=video 4; film 7=blend video 4 and 5; film 8=video 5. In one embodiment, controller 106 includes appropriate frame buffers and image processing capability to perform such processes. In such embodiments, a blend of images may be a weighted average of images. For example, when recording film frame 4, the display device will output an image that is 20% of video frame 2 and 80% of video frame 3. Other types of blending are also contemplated, such as non-linear weighting.

In embodiments of the present invention where the number of frames per second needs to be decreased, video frames can be selectively dropped to match the film frames per second. In addition to, or alternatively, video frames may be blended to match the desired film frames rate. As an example, if a video source provides 60 fps, and the film is shot at 24fps: film frame 1=blend video frame 1 and 2; film frame 2=blend video frames 2, 3, and 4; etc. In various embodiments the blend may included weighted averages, as illustrated above. In other embodiments, other techniques for down-sampling are envisioned.

In embodiments of the present invention, the processing times for determining images to be displayed on display device (via up sampling and/or down sampling the video frame rates) is believed to be small compared to the amount of time the film is exposed to each resulting frame on the display device. For example, in one embodiment, the frame exposure time may be on the order of one frame per second. In contrast, the amount of time to perform blending of images, as described above may be on the order of $\frac{1}{10}$ of a second, or less, depending on specific embodiment.

In one embodiment, the video images are first determined, processed, and the display outputs the first blended image, then the process repeats. In a pipelined embodiment, while the display outputs the first blended image, video images for the second blended image are determined, and processed. Then, immediately after the first blended image is displayed, the display outputs the second blended image, etc. This "pipelined" method for determining images to display on display device increases the number of frames that may be recorded to film per time period, i.e. throughput.

In the foregoing specification, the invention has been described with reference to specific exemplary embodiments thereof. Many changes or modifications are readily envisioned. In light of the above disclosure, one of ordinary skill in the art would recognize that any number of applications of the above concepts are possible. For example, various embodiments of flat panel displays are contemplated such as LCD, OLED, digital light, Plasma, EL, and the like; various supplemental illumination sources are contemplated, such as xenon flash, argon flash, LED, and the like; various positioning mechanism are contemplated, such as movable platform on a track, gimbaled mechanism, and the like.

In embodiments of the present invention, because the film recording process is reduced, users now have ability to directly create interpositive or internegative images not only camera negatives. Embodiments provide the capability of recording to intermediate material by increasing the illumination (via light pumps) to the display panel. The practical implications are that fewer film transfer processes or dupes are required between the exposed film media and the release print. Accordingly, release prints will have better quality by at least one or two generations, thereby increasing the quality of the release print and audiences' theatre experience. When recording onto camera film, light pumps may not be necessary.

Embodiments of the present invention may be applied to any type of image that may be displayed on a flat panel monitor. For example, the images may be computer generated, the images may be a combination of computer generated and live action, the images may be derived from any number of video display formats such as 720i (30 fps), 720p (24 or 60 fps), 1080i (30 fps), 1080p (24 or 60 fps), or the like. Accordingly, the concepts disclosed above are extremely valuable in a variety of applications.

Additionally, embodiments can be applied to adjust the aspect ratio of the film in a variety of formats such as: 1.33:1 1.77:1, 1.66:1, 1.85:1, 2.39:1, 2.35:1 or the like. In various embodiments, this may include cropping of a source image, or the like, before it is displayed on the display device, so that the desired aspect ratio is output, or cropping with a film gate in the recording device.

In still other embodiments, controller 106 may be configured to control the images displayed on display device 104 and coordinated with the display with film advance controls such that multiple images may be displayed on a single frame of film. Multiple exposures are useful for increasing color range (temporal dithering), and for controlling various aspects of the effect of the exposed frame such as overexposure, blurring, color, brightness, etc. In various embodiments, controller 106 is also configured to control the resolution of the film image by adjusting the resolution of the display (such as with spatial color dithering.) In some embodiments, exposure of the film may be performed by controlling the image display time (time modulated system), by controlling the shutter (intensity controlled system), or a combination of these techniques.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A recording system comprising:
a first digital imaging device comprising an electronically addressable digital flat panel display configured to display a first static digital image of a first video frame and a successive second static digital image of a second digital video frame, said first static digital image video frame being generated directly from source data representative of a first full digital source image and said second static digital image video frame being generated directly from source data representative of a second full digital source image of a movie;
a control unit coupled to the flat panel display, said control unit being configured to receive video data including first digital data associated with the first video frame and second digital data associated with the second video frame, wherein the control unit is also configured to determine the first video frame in response to the data associated with the first video frame and configured to determine the second video frame in response to the data associated with the second video frame, and wherein the control unit is also configured to drive the flat panel display with the first video frame and the second video frame;
a film recorder configured to record, onto movie film media, the first and second static digital images displayed on the flat panel display at a spatial resolution, color purity and depth resolution conforming to that of the first full digital image and the second full digital image; and
an adjustment mechanism coupled to the flat panel display and to the film recorder, the adjustment mechanism configured to adjust the orientation of the flat panel display relative to the film recorder in order to capture a succession of said first frame and said second frame;

a second digital imaging device comprising a digital light projector device coupled to the control unit, the digital light projector being configured to illuminate the back side of the digital flat panel display;

wherein the control unit is also configured to drive the digital light projector with the first video frame while the flat panel display is driven with the first video frame in order to enhance location-specific brightness and color of the corresponding full digital static image displayed by the first digital imaging device as photographed by the film recorder.

2. The recording system of claim 1
wherein the control unit is also coupled to the film recorder, and
wherein the control unit is also configured to direct the film recorder to open and close a shutter and to advance the film.

3. The recording system of claim 1 wherein the video data is encoded in a display format selected from the group: NTSC, PAL, SECAM, 720p, 720i, 1080i, 1080p.

4. The recording system of claim of claim 1 wherein the video data is encoded in an encoding format selected from: Windows Media Video, AVI, MPEG-1, MPEG-2, MPEG-4, MJPEG, DivX, QuickTime, RealMedia, H.261, and H.263.

5. The recording system of claim 1 further comprising:
an external illumination source configured to illuminate the flat panel display in order to enhance the static image displayed by the first digital imaging device;
wherein the external illumination source is selected from the group: LED, strobe lamp, digital light projector.

6. The recording system of claim 1 wherein frame rate for the digital source images is substantially similar to a frame rate for film.

7. A method for transferring video data to movie film media on a frame-by-frame basis comprising:
providing a plurality of digital light projectors coupled to a control unit, the digital light projectors configured to jointly and severally illuminate flat panel displays with matched full digital static images;
receiving directly from a digital data source at least a portion of a stream of digital video data at the digital flat panel displays;
determining first data for a first full static digital image from the portion stream of video data;
driving the flat panel display with the first data corresponding to the first full static digital image;
displaying the first full static digital image on the digital flat panel display in response to the first data;
recording the first full static digital image onto a first frame of the movie film media with the film camera at a spatial and depth resolution substantially the same as that of the first full digital image;
advancing the film media;
determining second data for a second full static digital image from the portion of the stream of video data;
driving the digital flat panel display with the second data corresponding to the second full static digital image;
displaying the second full static digital image on the digital flat panel display in response to the second data; and
recording the second full static digital image onto a second frame of film media with the film camera at a spatial and depth resolution substantially the same as that of the second full digital image as part of a continuous movie film
wherein the control unit is also configured to drive the digital light projectors with the first video frame while the flat panel display is driven with the first video frame in order to enhance location-specific brightness and color of the corresponding full digital static image displayed by the first digital imaging device as photographed by the film recorder.

8. The method of claim 7 further comprising:
driving a digital light projector with the first data; and
projecting the first full digital static image onto a back side of the flat panel display to thereby illuminate the flat panel display in order to enhance location-specific brightness and color of the corresponding first full digital static image displayed by the first digital imaging device as photographed by the film recorder.

9. The method of claim 7 further comprising illuminating at least a portion of the flat panel display with a light source selected from the group: LEDs, strobe lamps.

10. The method of claim 7 wherein the stream of video data is encoded in a display format selected from the group: NTSC, PAL, SECAM, 720p, 720i, 1080i, 1080p.

11. The method of claim 7 wherein the stream of video data is encoded in an encoding format selected from: Windows Media Video, AVI, MPEG-1, MPEG-2, MPEG-4, MJPEG, DivX, QuickTime, RealMedia, H.261, and H.263.

12. The method of claim 7 wherein a frame rate for the stream of video data compared to a frame rate for the film media is selected from the group: substantially equal, greater, lesser.

13. The method of claim 7 further comprising:
a) further advancing the movie film media;
b) determining third data for a third image from the portion of the stream of video data;
c) driving the flat panel display with the third data;
d) displaying the third image on the flat panel display in response to the second data;
e) recording the third image onto a third frame of the movie film media with the film camera;
f) repeating steps a)-f) for recording additional images onto subsequent frames of the film media; and
g) determining an approximate number of frames of the movie film media that are recorded; and
h) determining a cost for transferring the video data to film in response to the approximate number of frames.

* * * * *